(12) United States Patent
Wang et al.

(10) Patent No.: US 12,695,866 B2
(45) Date of Patent: Jul. 28, 2026

(54) INTRA MODE CODING BASED ON TEMPLATE

(71) Applicant: Tencent America LLC, Palo Alto, CA (US)

(72) Inventors: Biao Wang, San Jose, CA (US); Roman Chernyak, Santa Clara, CA (US); Lien-Fei Chen, Palo Alto, CA (US); Yonguk Yoon, Palo Alto, CA (US); Motong Xu, Palo Alto, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/914,018

(22) Filed: Oct. 11, 2024

(65) Prior Publication Data

US 2025/0126249 A1 Apr. 17, 2025

Related U.S. Application Data

(60) Provisional application No. 63/544,519, filed on Oct. 17, 2023.

(51) Int. Cl.
| | |
|---|---|
| *H04N 19/11* | (2014.01) |
| *H04N 19/159* | (2014.01) |
| *H04N 19/176* | (2014.01) |
| *H04N 19/593* | (2014.01) |
| *H04N 19/70* | (2014.01) |

(52) U.S. Cl.
CPC ........... *H04N 19/11* (2014.11); *H04N 19/159* (2014.11); *H04N 19/176* (2014.11); *H04N 19/593* (2014.11); *H04N 19/70* (2014.11)

(58) Field of Classification Search
CPC ..... H04N 19/11; H04N 19/176; H04N 19/593
USPC ...................................................... 375/240.12
See application file for complete search history.

(56) References Cited

U.S. PATENT DOCUMENTS

2023/0217016 A1 7/2023 Filippov et al.

OTHER PUBLICATIONS

International Search Report and Written Opinion received for PCT Patent Application No. PCT/US2024/051261, mailed on Dec. 9, 2024, 10 pages.

*Primary Examiner* — Justin W Rider
(74) *Attorney, Agent, or Firm* — ARENTFOX SCHIFF LLP

(57) ABSTRACT

Aspects of the disclosure includes methods and apparatuses for video decoding and encoding and a method of processing visual media data. The method for video decoding includes receiving coded information in a bitstream indicating that a first intra mode coding method using one of (i) a template-based intra prediction mode derivation (TIMD) and (ii) a decoder-side intra mode derivation (DIMD) is not enabled for a current block. The method for video decoding includes determining at least one template-based intra mode with the first intra mode coding method using the one of the TIMD and the DIMD; and when the at least one template-based intra mode is to be excluded from a second intra mode coding method, determining an intra prediction mode of the current block using the second intra mode coding method excluding the at least one template-based intra mode, and reconstructing the current block using the intra prediction mode.

20 Claims, 13 Drawing Sheets

1000

| coding_unit( x0, y0, cbWidth, cbHeight, cqt Depth, treeType, modeType ) { | Descriptor |
|---|---|
| ... | |
| method_A_flag | ae(v) |
| other_methods | ae(v) |
| ... | |
| if(method_A_flag){ | |
|    return | |
| } | |
| method_B_flag | ae(v) |
| if(method_B_flag) { | |
|   method_B_related_syntax | ae(v) |
| ... | |
| } else { | |
|   method_B_related_syntax | ae(v) |
| ... | |
| } | |

1001 — method_A_flag
1002 — other_methods
1003 — method_B_flag
1004 — method_B_related_syntax
1005 — method_B_related_syntax

| Index | Codeword |
|---|---|
| 0 | 0 |
| 1 | 10 |
| 2 | 110 |
| 3 | 1110 |
| 4 | 11110 |
| 5 | 11111 |

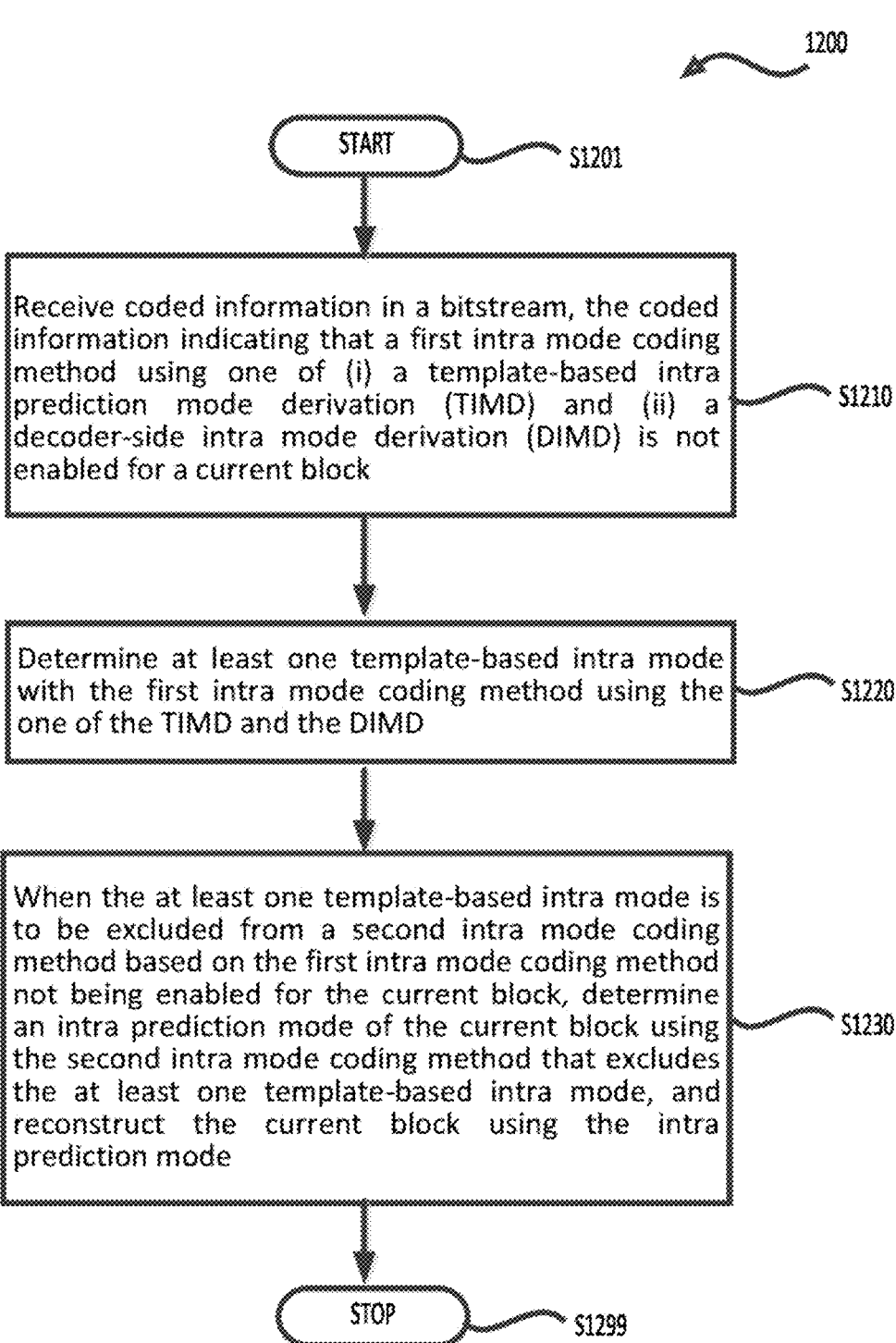

1200

START — S1201

Receive coded information in a bitstream, the coded information indicating that a first intra mode coding method using one of (i) a template-based intra prediction mode derivation (TIMD) and (ii) a decoder-side intra mode derivation (DIMD) is not enabled for a current block — S1210

Determine at least one template-based intra mode with the first intra mode coding method using the one of the TIMD and the DIMD — S1220

When the at least one template-based intra mode is to be excluded from a second intra mode coding method based on the first intra mode coding method not being enabled for the current block, determine an intra prediction mode of the current block using the second intra mode coding method that excludes the at least one template-based intra mode, and reconstruct the current block using the intra prediction mode — S1230

STOP — S1299

*FIG. 12*

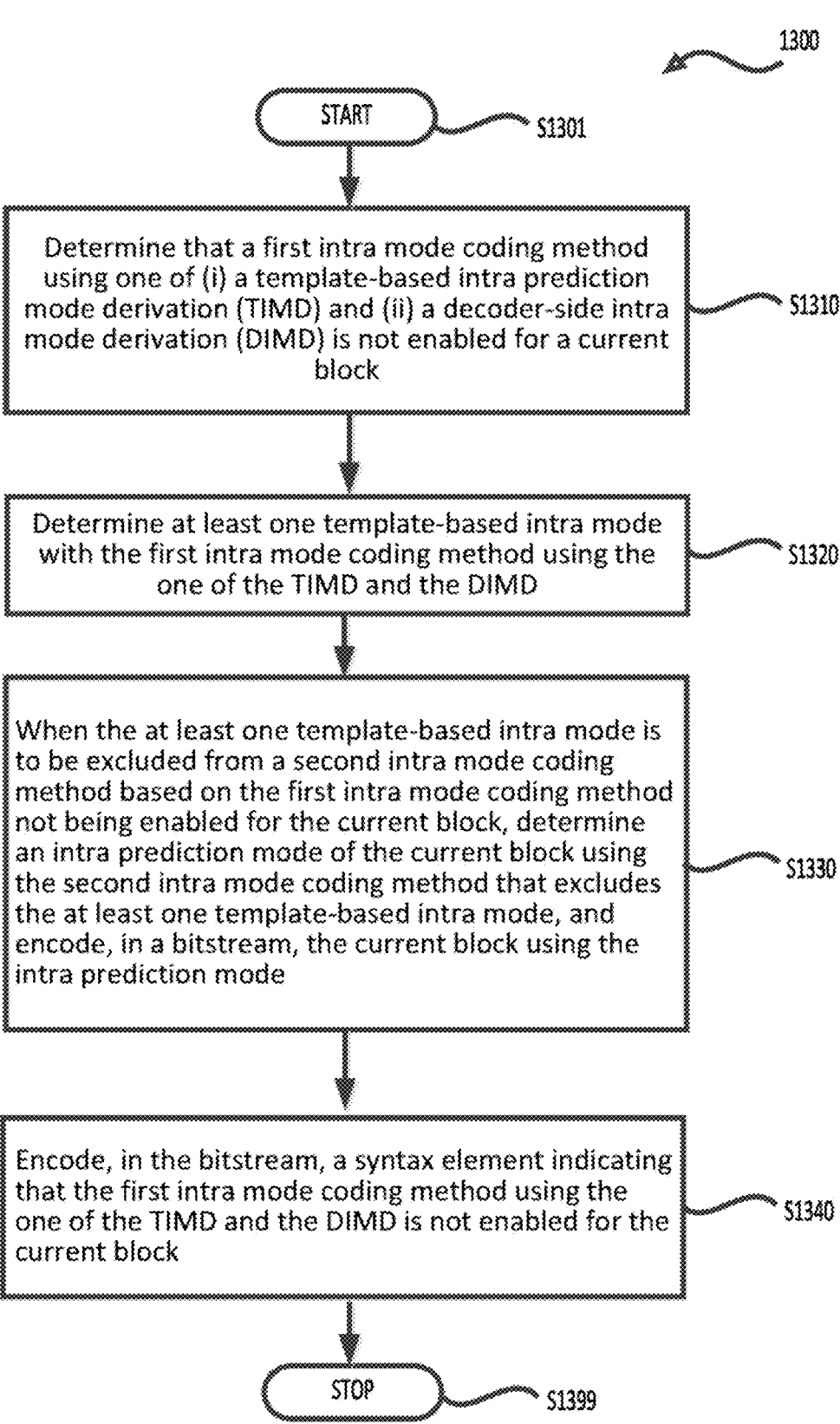

1300

START — S1301

Determine that a first intra mode coding method using one of (i) a template-based intra prediction mode derivation (TIMD) and (ii) a decoder-side intra mode derivation (DIMD) is not enabled for a current block — S1310

Determine at least one template-based intra mode with the first intra mode coding method using the one of the TIMD and the DIMD — S1320

When the at least one template-based intra mode is to be excluded from a second intra mode coding method based on the first intra mode coding method not being enabled for the current block, determine an intra prediction mode of the current block using the second intra mode coding method that excludes the at least one template-based intra mode, and encode, in a bitstream, the current block using the intra prediction mode — S1330

Encode, in the bitstream, a syntax element indicating that the first intra mode coding method using the one of the TIMD and the DIMD is not enabled for the current block — S1340

STOP — S1399

FIG. 13

INTRA MODE CODING BASED ON TEMPLATE

RELATED APPLICATION

The present application claims the benefit of priority to U.S. Provisional Application No. 63/544,519, filed on Oct. 17, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding.

According to an aspect of the disclosure, a method for video decoding includes receiving coded information in a bitstream. The coded information indicates that a first intra mode coding method using one of (i) a template-based intra prediction mode derivation (TIMD) and (ii) a decoder-side intra mode derivation (DIMD) is not enabled for a current block. The method for video decoding includes determining at least one template-based intra mode with the first intra mode coding method using the one of the TIMD and the DIMD; and when the at least one template-based intra mode is to be excluded from a second intra mode coding method based on the first intra mode coding method not being enabled for the current block, determining an intra prediction mode of the current block using the second intra mode coding method that excludes the at least one template-based intra mode, and reconstructing the current block using the intra prediction mode In an aspect, a method for video encoding includes, determining that a first intra mode coding method using one of (i) a template-based intra prediction mode derivation (TIMD) and (ii) a decoder-side intra mode derivation (DIMD) is not enabled for a current block; determining at least one template-based intra mode with the first intra mode coding method using the one of (i) the TIMD and (ii) the DIMD; when the at least one template-based intra mode is to be excluded from a second intra mode coding method based on the first intra mode coding method not being enabled for the current block, determining an intra prediction mode of the current block using the second intra mode coding method that excludes the at least one template-based intra mode, and encoding, in a bitstream, the current block using the intra prediction mode; and encoding, in the bitstream, a syntax element indicating that the first intra mode coding method using the one of the TIMD and the DIMD is not enabled for the current block.

In an aspect, a method of processing visual media data includes processing a bitstream of the visual media data according to a format rule. The bitstream includes a syntax element indicating that a first intra mode coding method using one of (i) a template-based intra prediction mode derivation (TIMD) and (ii) a decoder-side intra mode derivation (DIMD) is not enabled for a current block. The format rule specifies that at least one template-based intra mode is determined with the first intra mode coding method using the one of the TIMD and the DIMD; and when the at least one template-based intra mode is to be excluded from a second intra mode coding method based on the first intra mode coding method not being enabled for the current block, an intra prediction mode of the current block is determined using the second intra mode coding method that excludes the at least one template-based intra mode and the current block is processed using the intra prediction mode.

Aspects of the disclosure also provide an apparatus for video encoding. The apparatus for video encoding including processing circuitry configured to implement any of the described methods for video encoding.

Aspects of the disclosure also provide an apparatus for video decoding. The apparatus for video decoding including processing circuitry configured to implement any of the described methods for video encoding.

Aspects of the disclosure also provide a non-transitory computer-readable medium storing instructions which, when executed by a computer, cause the computer to perform any of the described methods for video decoding/encoding.

Technical solutions of the disclosure include aspects directed to reducing signaling requirements for intra mode coding using an MPM list. When the intra mode coding using an MPM list is used, the signaling of an intra prediction mode of a current block may use a relatively large number of bits in a bitstream, for example, when the intra prediction mode is not at a first entry or a second entry of the MPM list. In an example, when a first intra mode coding method using one of (i) the TIMD and (ii) the DIMD is not enabled for the current block, at least one template-based intra mode determined with the first intra mode coding method using the one of the TIMD and the DIMD may be excluded from being used in a second intra mode coding method such as the intra mode coding using an MPM list. Thus, the intra prediction mode of the current block may be determined using the second intra mode coding method that excludes the at least one template-based intra mode. The template-based intra mode(s) in the first intra mode coding method may use less bits to signal, and thus that the template-based intra mode(s) have been evaluated and have not been chosen by the encoder may indicate that the prediction signal derived based on the template-based intra mode(s) may not be a good indicator of the current block.

The probability of using the template-based intra mode(s) in the intra mode coding using an MPM list is likely to be relatively low, for example, because the intra mode coding using an MPM list may encode more bits than the first intra mode coding method. Thus, excluding the at least one template-based intra mode from the intra mode coding using an MPM list can reduce a number of bits signaled to indicate the intra prediction mode used to code the current block. In an example, the prediction signal derived based on the intra prediction mode may be a good indicator of the current block as the template-based intra mode(s) are excluded.

In an example, the template-based intra mode(s) may be included in the MPM list when the template-based intra mode(s) are at the first entry and/or the second entry of the MPM list, and thus the signaling cost for the intra prediction mode can be relatively low compared with related technologies as the codeword lengths of the first entry and the second entry are the smallest in the MPM list.

BRIEF DESCRIPTION OF THE DRAWINGS

Further features, the nature, and various advantages of the disclosed subject matter will be more apparent from the following detailed description and the accompanying drawings in which:

FIG. 12 shows a flow chart outlining a decoding process according to some aspects of the disclosure.

FIG. 13 shows a flow chart outlining an encoding process according to some aspects of the disclosure.

DETAILED DESCRIPTION

Figure 1:
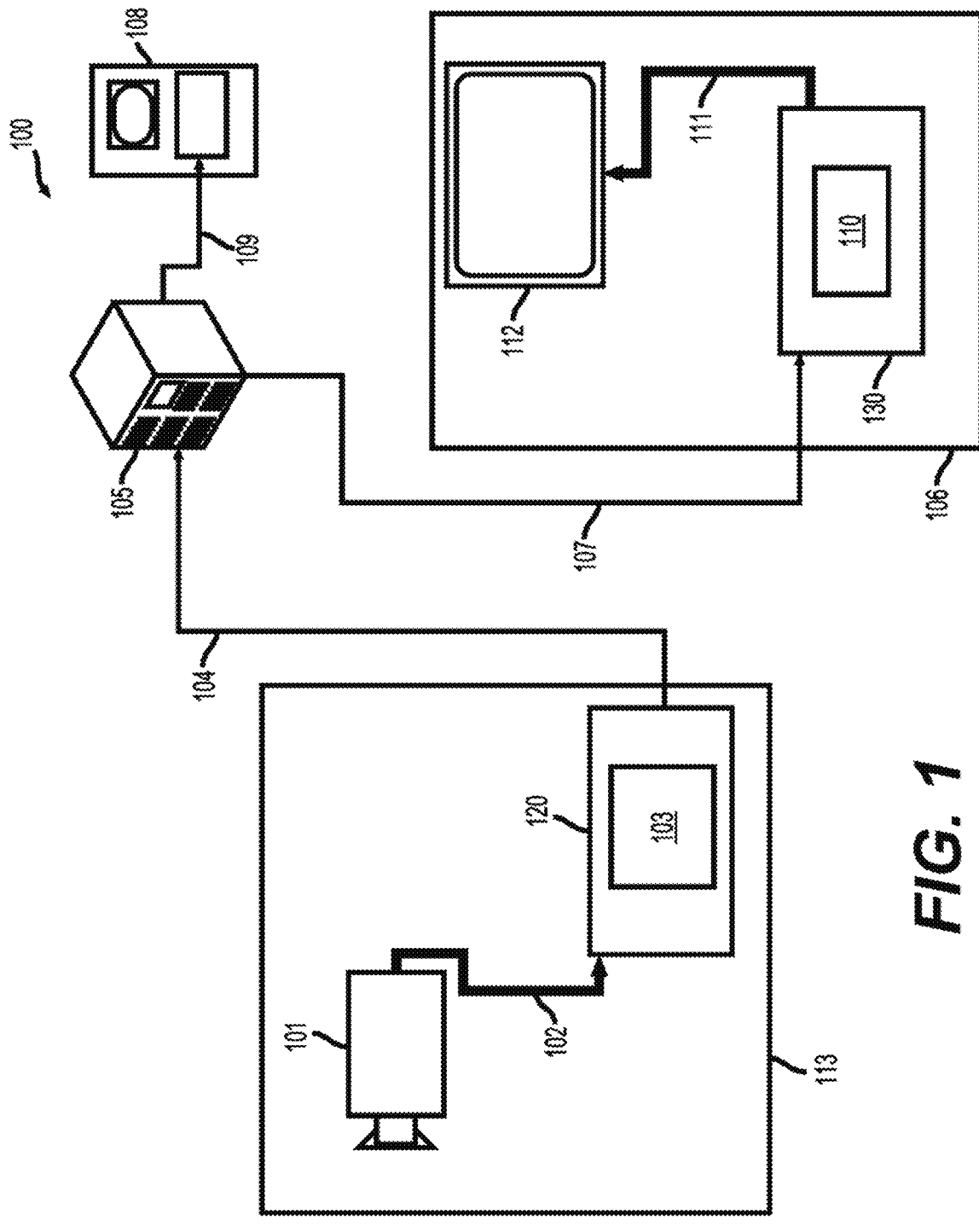
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
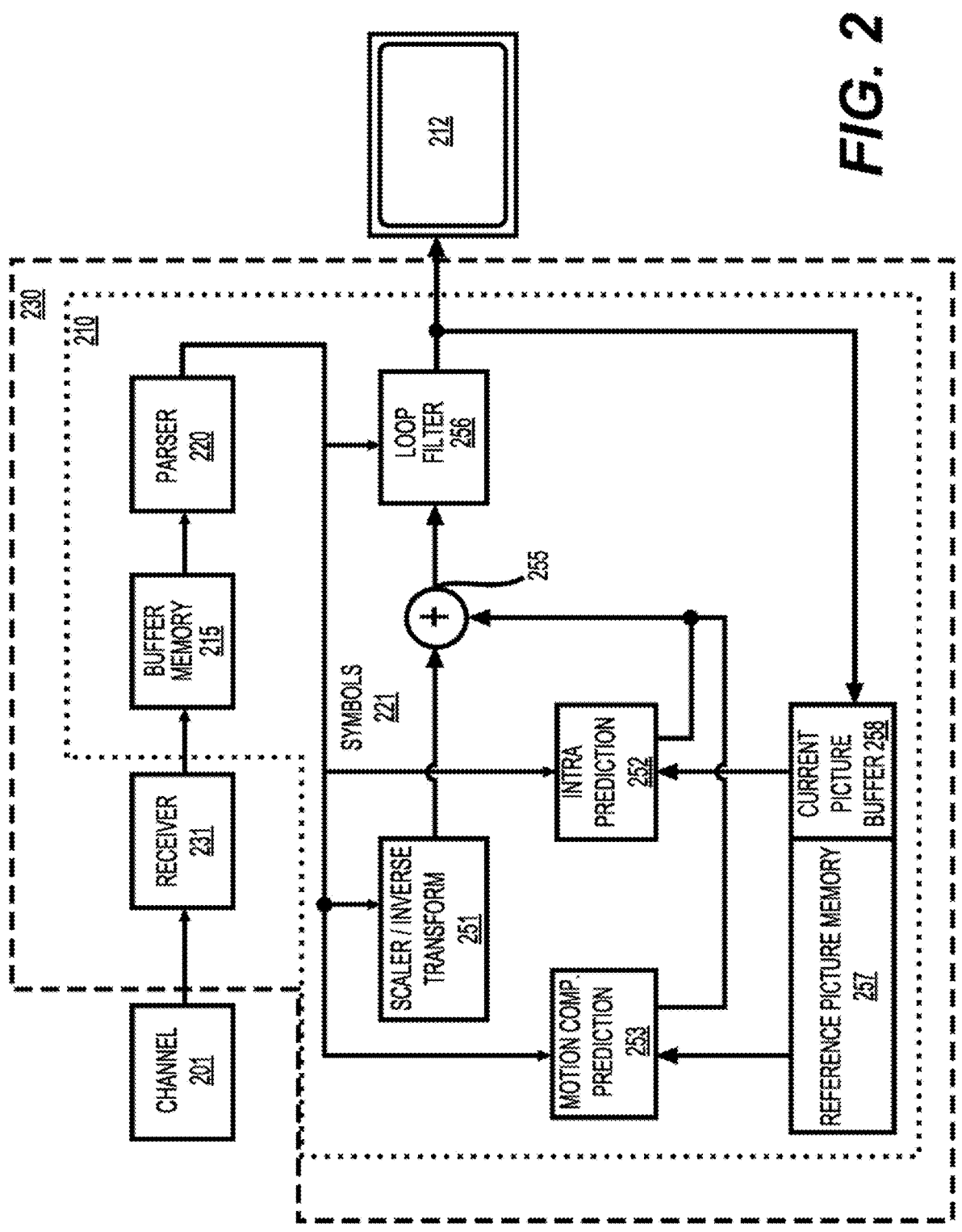
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
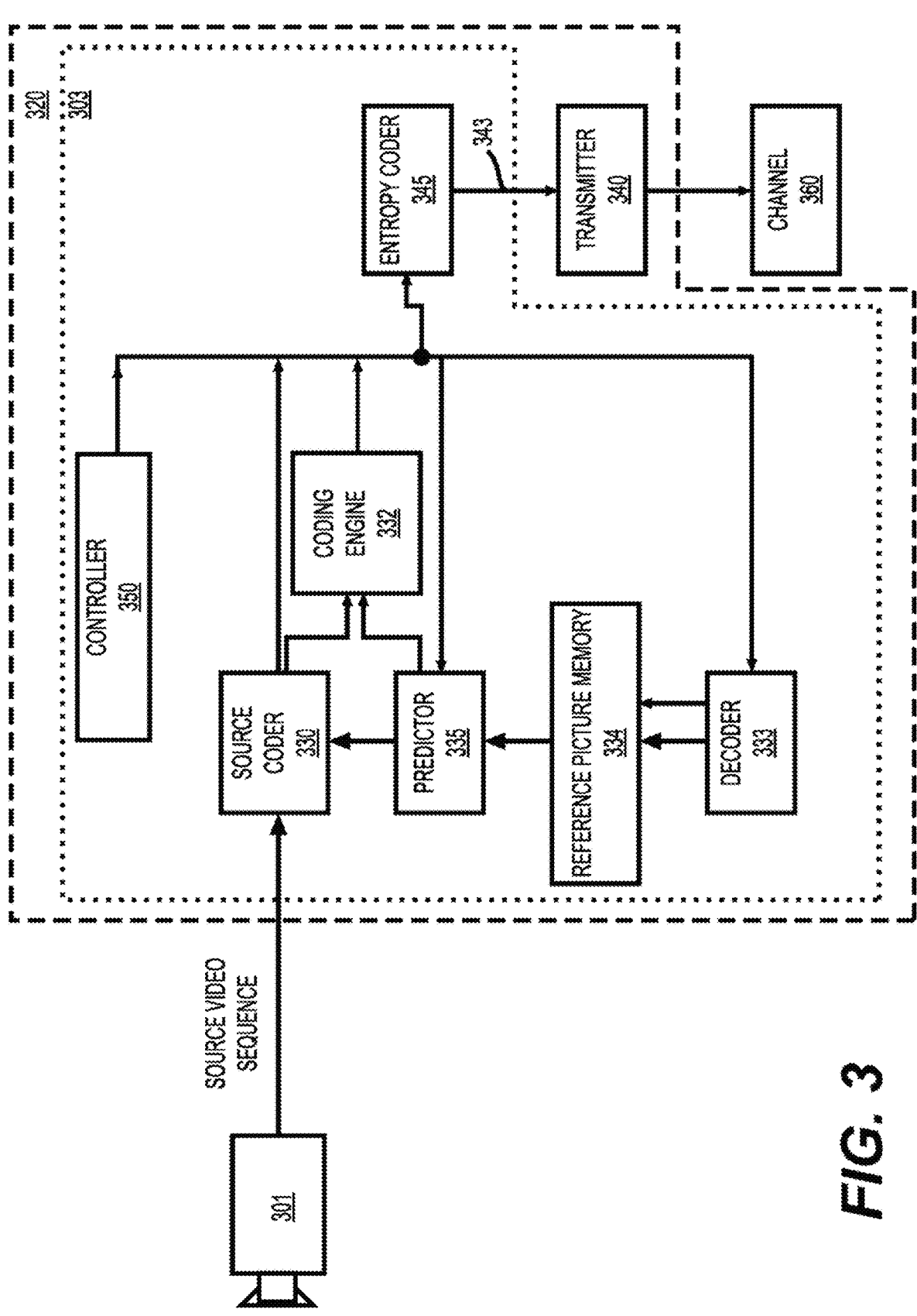
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can include one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may include temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16

CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

In intra prediction or an intra prediction mode, sample values of a coding block in a current picture may be predicted from samples that are already reconstructed (referred to as reference samples) in the current picture. The samples may be in one or more reference lines.

A predictor block may be formed using neighboring sample values of already available samples. Sample values of neighboring samples may be copied into the predictor block according to a direction. A reference to the direction in use may be coded in the bitstream or may itself be predicted.

An example of intra prediction is a planar mode that may use a bi-linear interpolation. In the planar mode, one or more positions in the current block may be predicted using reference samples in a reference line. Other positions in the current block may be predicted as a linear combination of sample(s) at the one or more positions and the reference samples. Weights may be determined according to a location of a current sample in the current block.

An example of intra prediction is a DC mode. To predict a sample in a block with the DC mode, an average of samples in a reference line may be used as the predictor.

An example of intra prediction is angular intra prediction. In the angular intra prediction, a current sample in a current block may be predicted using a reference sample (e.g., a prediction sample) or an interpolated reference sample, for example, in a reference line, such as shown in FIG. 4.

Figure 4:
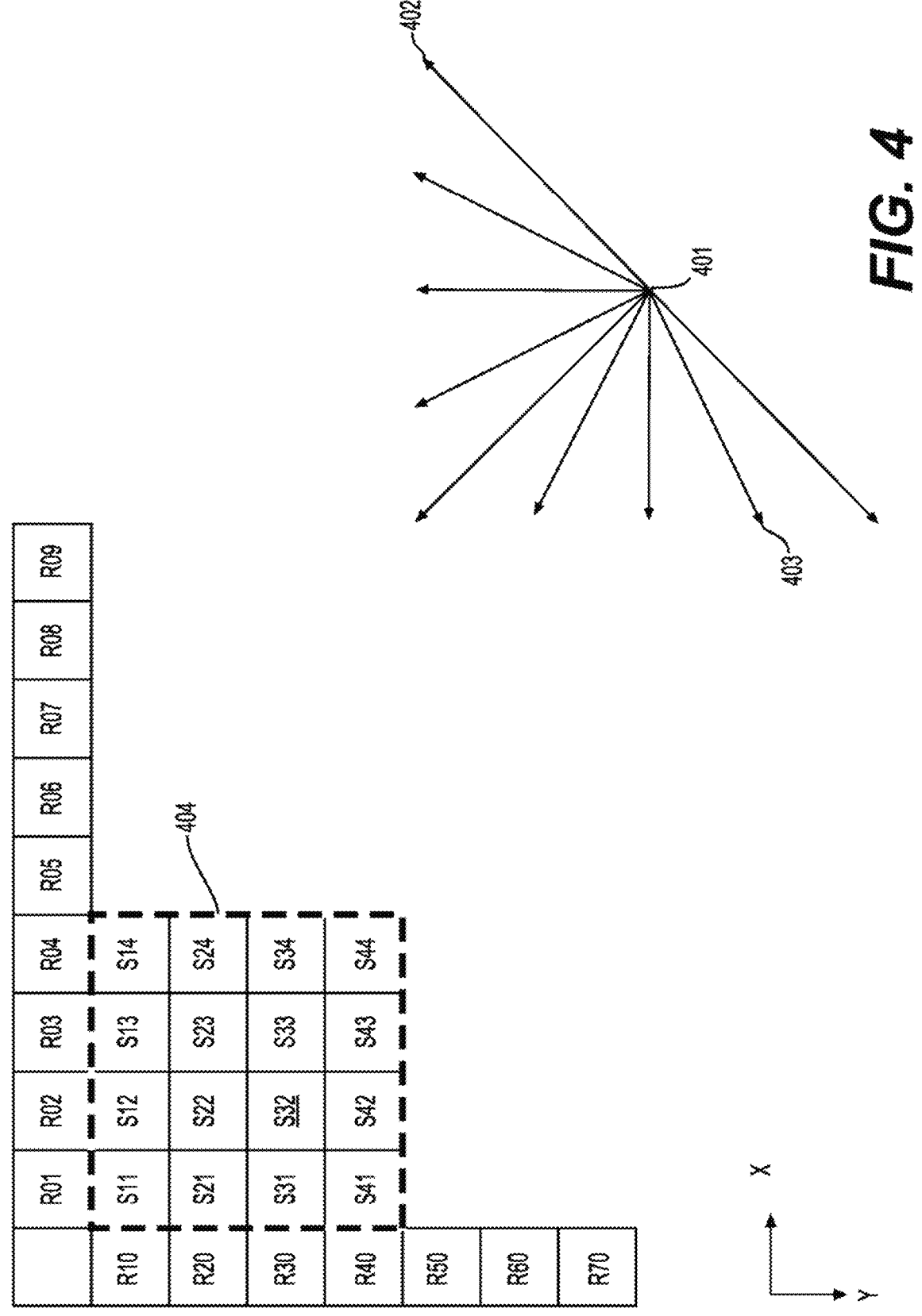
FIG. 4 shows an example of intra prediction according to an aspect of the disclosure.

Referring to FIG. 4, depicted in the lower right is a subset of nine predictor directions from a plurality of predictor directions (e.g., 33 angular modes of the 35 intra modes in H.265). A point (401) where the arrows converge represents a sample being predicted. Each of the arrows may represent a respective direction from which the sample is being predicted. For example, the arrow (402) indicates that the sample (401) is predicted from a sample or samples to the upper right, at a 45° angle from the horizontal direction. Similarly, the arrow (403) indicates that the sample (401) is predicted from a sample or samples to the lower left of the sample (401), in a 22.5° angle from the horizontal direction.

Still referring to FIG. 4, on the top left there is depicted a square block (404) of 4×4 samples (indicated by a dashed, boldface line). The square block (404) includes 16 samples, each labelled with an "S", its position in the Y dimension (e.g., row index) and its position in the X dimension (e.g., column index). For example, a sample S21 is the second sample in the Y dimension (from the top) and the first (from the left) sample in the X dimension. Similarly, a sample S44 is the fourth sample in block (404) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to the block (404). In some examples, prediction samples neighbor the block under reconstruction; therefore, no negative values need to be used.

Intra picture prediction may work by copying reference sample values from the neighboring samples indicated by the signaled prediction direction. For example, assume the coded video bitstream includes signaling that, for this block, indicates a prediction direction consistent with the arrow (402)—that is, samples are predicted from samples to the upper right, at a 45° angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45°.

The number of possible directions has increased as video coding technology has developed. In an example, such as in H.264, nine different directions may be represented. In an example, such as in H.265, 33 different directions may be used. In an example, such as in JEM/VVC/BMS, up to 65 directions may be used. Experiments have been conducted to identify the most likely directions, and certain techniques in the entropy coding are used to represent those likely directions in a small number of bits, accepting a certain penalty for less likely directions. In some examples, the directions may be predicted from neighboring directions used in neighboring, already decoded, blocks.

Various intra prediction coding tools are introduced to improve the encoding efficiency, including but not limited to: angular intra prediction with 65 angles and 4-tap interpolation filters, wide-angle intra prediction (WAIP), position dependent prediction combination (PDPC), multiple reference line (MRL) prediction, an intra sub-partition (ISP) Mode, matrix-based intra prediction (MIP), a cross component linear model (CCLM), intra mode coding with 6 most probable modes (MPMs), and/or the like.

Figure 5:
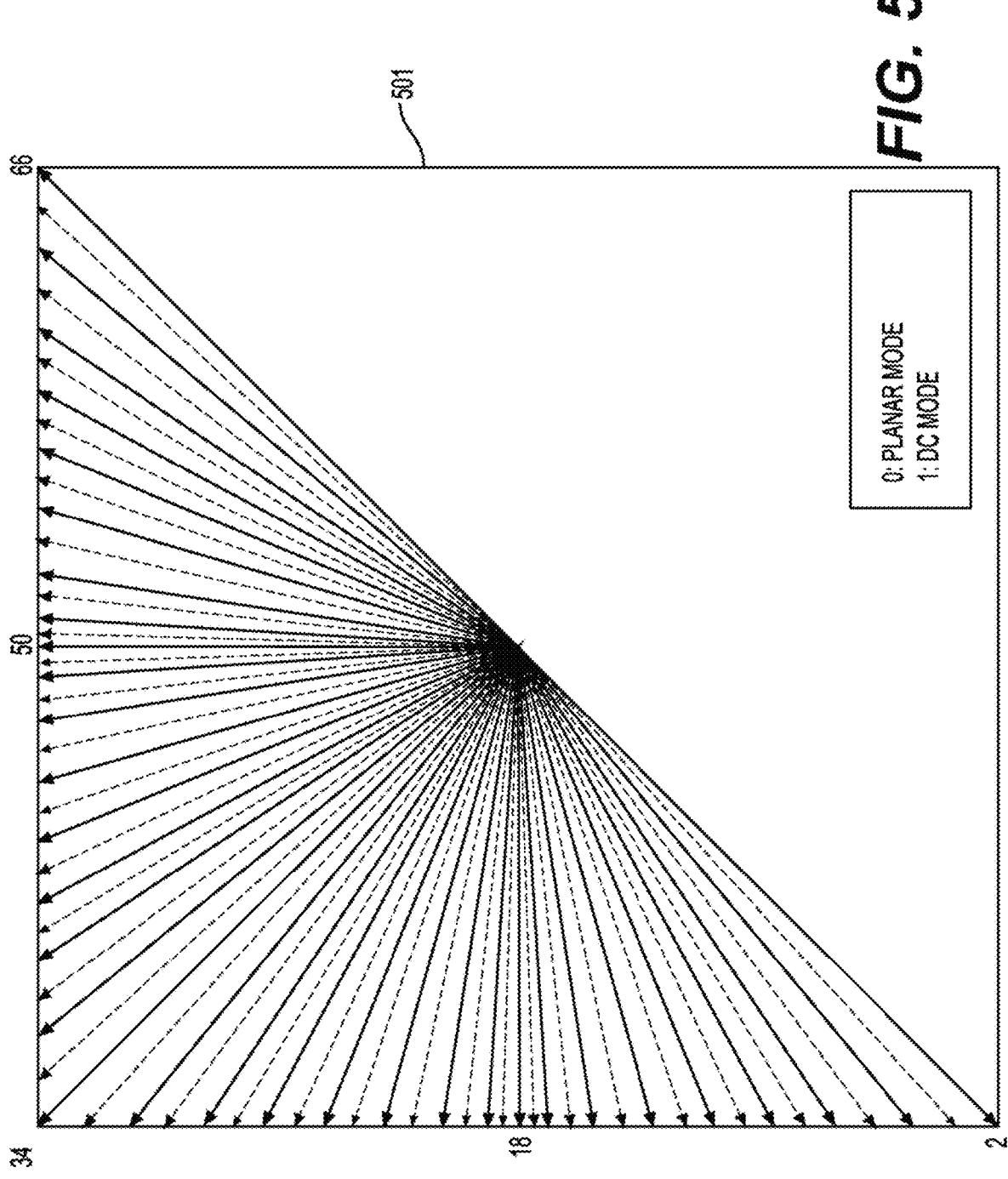
FIG. 5 shows an example of 67 intra prediction modes according to an aspect of the disclosure.

FIG. 5 shows a schematic (501) that depicts 67 intra prediction modes for example, according to JEM. The 67 intra prediction modes may include 65 angular modes corresponding to 65 intra prediction directions, respectively, the planar mode, and the DC mode. The mapping of intra prediction direction bits that represent the direction in the coded video bitstream may be different from video coding technology to video coding technology. Such mapping may range, for example, from simple direct mappings, to codewords, to complex adaptive schemes involving most probable modes, and similar techniques. In most cases, however, there may be certain directions that are statistically less likely to occur in video content than certain other directions. As the goal of video compression is the reduction of redundancy, those less likely directions may, in a well working video coding technology, be represented by a larger number of bits than more likely directions.

In some examples, a template may be used to derive an intra prediction mode for a current block (also referred to as a current coding block). A current coding block and neighboring samples of the current coding block may share similar texture characteristics. Thus, neighboring reconstructed samples of the current coding block may be employed to predict the current coding block. A template may include the neighboring samples (e.g., the neighboring reconstructed samples) of the current coding block.

A method A may include a template-based derivation method that can derive a prediction mode such as an intra prediction mode for the current block. In an example, the method A includes template-based intra prediction mode derivation (TIMD) that may be applied to the current coding block. When the template and the current coding block are well correlated, the intra prediction mode applied to the template may give a good indication for the current block.

Figure 6:
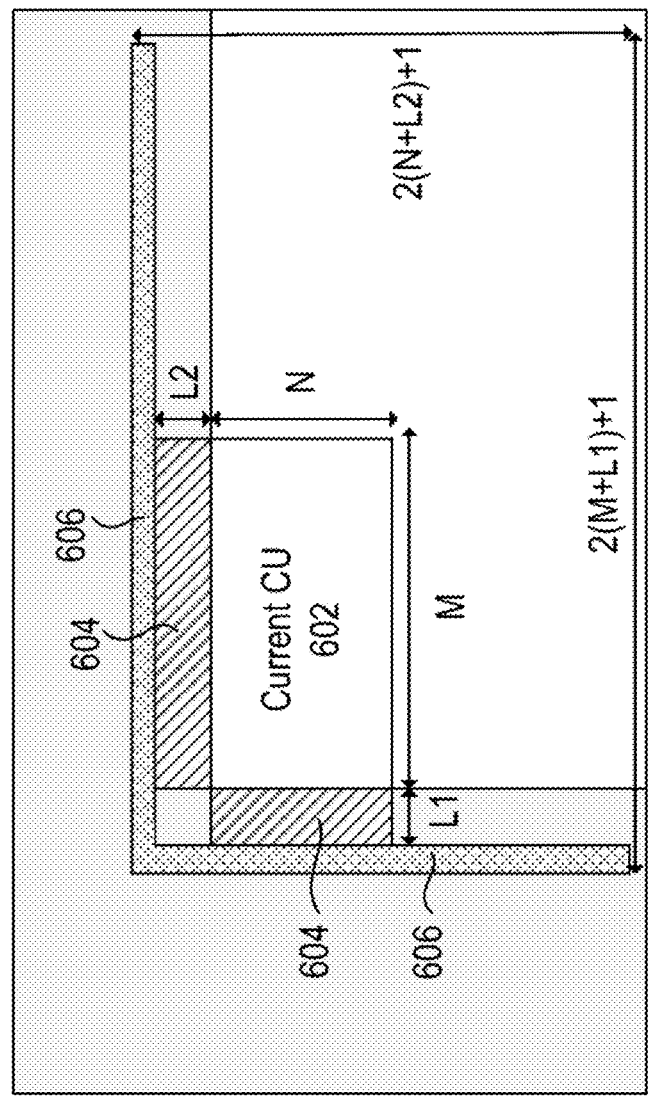
FIG. 6 shows an example of template-based intra mode derivation method according to an aspect of the disclosure.

Referring to FIG. 6, neighboring reconstructed samples of a current CU (or a current block) (602) may be used as a template (604). The template (604) may have any suitable shape and include any suitable number of samples. The template (604) may be adjacent to the current CU (602). In an aspect, the template (604) includes reconstructed samples. In the example shown in FIG. 6, the template (604) has an "L" shape and includes a top template that is above the current CU (602) and a left template that is to the left of the current CU (602). In an example, the template (604) includes a top-left corner that is adjacent to the current CU (602). In an example, the template (604) includes the top template that is above the current CU (602). In an example, the template (604) includes the left template that is to the left of the current CU (602).

Reference samples (606) may be adjacent to the template (604). In an example, the reference samples (606) may include at least one line (e.g., at least one row and/or at least one column) of samples.

In some examples, according to the method A, the intra mode derivation using the template may include one or more of the following steps:

In a step 1, a group of samples may be defined as reference of the template (604), as shown in FIG. 6. The group of samples may be used as the reference samples (606) to generate a prediction signal of the template (604).

In a step 2, an intra prediction mode may be exercised (e.g., may be applied) to the reference samples (606) of the template (604) to generate the prediction signal, e.g., the prediction of the template (604). In an example, a pre-defined intra prediction mode set may include pre-defined intra modes (also referred to as pre-defined intra prediction modes), and the intra prediction mode that is applied to the reference samples (606) of the template (604) is one of the pre-defined intra modes.

In a step 3, a cost between the prediction signal of the template (604) and the template (604) may be determined. In an example, the template (604) is the reconstruction signal of the template (604) which is represented by the reconstructed samples in the template (604).

In an example, the cost is a sum of absolute transformed differences (SATD) cost between the prediction signal of the template (604) and the reconstruction signal of the template (604) and is calculated. In an example, the cost is a mean removal sum of absolute differences (MRSAD) between the prediction signal of the template (604) and the reconstruction signal of the template (604).

In a step 4, the steps 2 and 3 may be repeated for another mode in the pre-defined intra prediction mode set. The pre-defined intra modes may be sorted (e.g., ranked) based on the respective costs (e.g., the SATD costs or the MRSAD costs).

In a step 5, the mode with the least cost (e.g., the least SATD cost) is chosen as the prediction mode for the current block or the current CU (602). For the convenience of description, the prediction mode that is determined may be referred to as a template-based intra mode.

In some examples, in the method A, a plurality of prediction modes (e.g., a plurality of intra prediction modes) for the current CU (602) corresponding to least cost(s) in the costs may be selected, and the plurality of prediction modes may be referred to as template-based intra modes.

In an example, the method A may include the TIMD. In an aspect, the TIMD may use reference samples of a current CU as a template and select an intra mode among a set of candidate intra prediction modes that is associated with the TIMD. The selected intra mode may be determined as a best intra mode based on a cost function, for example. As shown in FIG. 6, the neighboring reconstructed samples of the current CU (602) can be used as the template (604). The reconstructed samples in the template (604) can be compared with the prediction samples of the template (604). The prediction samples can be generated using the reference samples (606) of the template (604). The reference samples (606) can include the neighboring reconstructed samples around the template (604). A cost function can be used to calculate a cost (or distortion) between the prediction samples and the reconstructed samples in the template (604) based on a respective one of the set of candidate intra prediction modes, such as described in the steps 3-4 above. An intra prediction mode with a minimum cost (or distortion) can be selected as the intra prediction mode (e.g., best intra prediction mode) to intra predict the current CU (602), such as described in the step 5. As described above, in some examples, in the TIMD, a plurality of intra prediction modes for the current CU (602) corresponding to least cost(s) in the costs may be selected, and the plurality of prediction modes may be referred to as template-based intra modes.

Referring to FIG. 6, a size of the reference samples (606) may depend on a size of the current CU (602) such as a block width M and a block height N and a size of the template (604) such as a template width L1 of the left template and a template height L2 of the top template. In an example, a width of the reference samples (606) may be equal to $2(M+L1)+1$ and a height of the reference samples (606) may be equal to $2(N+L2)+1$ if the reference samples (606) only consists one line of samples (e.g., one column of samples to the left of the template (604) and one row of samples above the template (604)).

Figure 7:
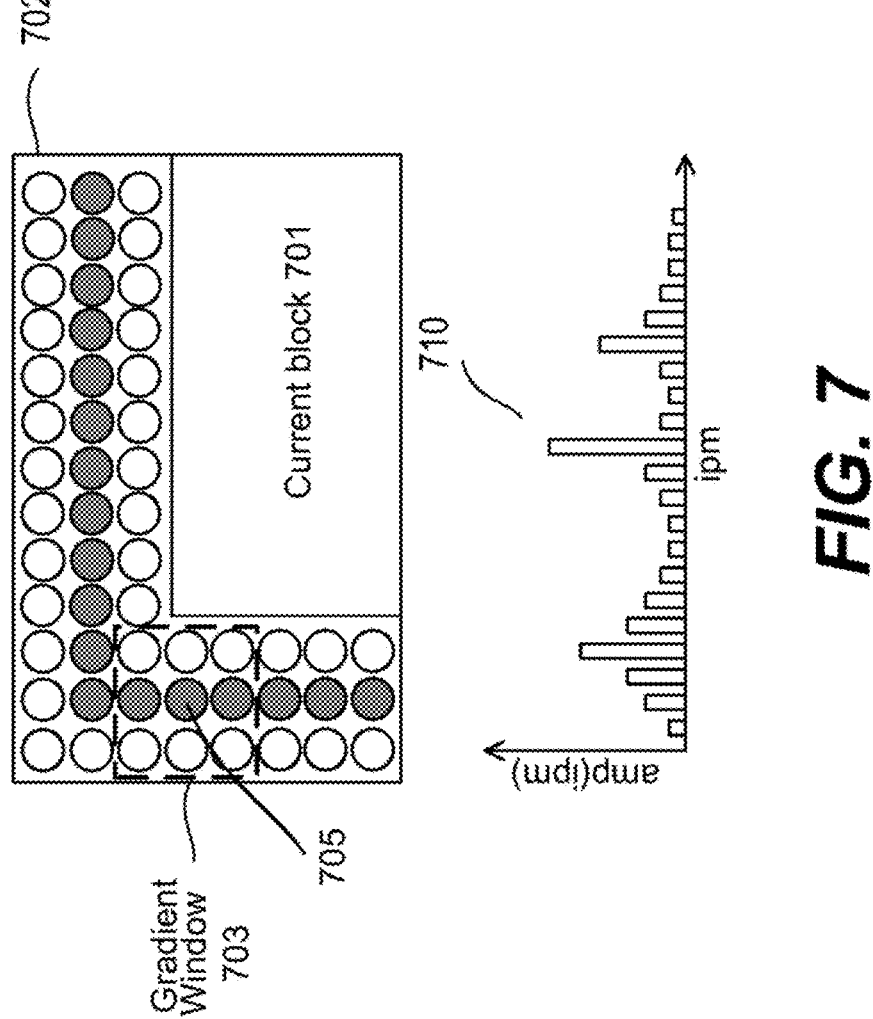
FIG. 7 shows an example of a decoder-side intra mode derivation (DIMD) according to an aspect of the disclosure.

In an example, the method A may include a decoder-side intra mode derivation (DIMD). When the DIMD is applied, N intra modes can be derived from reconstructed neighbor samples around a current block (701), and the N predictors obtained using the N intra modes can be combined with the planar mode predictor with corresponding weights. The weights can be derived from gradients, such as a histogram of gradient (HoG) computation. FIG. 7 shows an example of the DIMD. The HoG computation can be carried out by applying filters (e.g., horizontal and vertical Sobel filters) on pixels in a template (702) around the current block (701). The template (702) can include reconstructed neighbor samples around the current block (701). In an example, the template has a width of 3. In an example, pixels (marked in gray) in the middle line of the template (702) can be involved in the HoG computation. Referring to FIG. 7, a window (703) around a pixel (705) can be used to determine a gradient associated with the pixel (705). The window (703) can have a size of 3×3 with the pixel (705) in the center of the window (703). A horizontal gradient and a vertical gradient can be obtained using, for example, horizontal and vertical Sobel filters, respectively. A direction or an orientation can be obtained from the horizontal gradient and the vertical gradient. An intra prediction mode associated with the direction can be determined. Subsequently, a histogram of intra prediction modes (also referred to as a HoG) (710) can be obtained. The intra prediction modes corresponding to N tallest histogram bars can be selected for the current block (701). In an example, the N intra prediction modes may be referred to as template-based intra modes.

Figure 8:
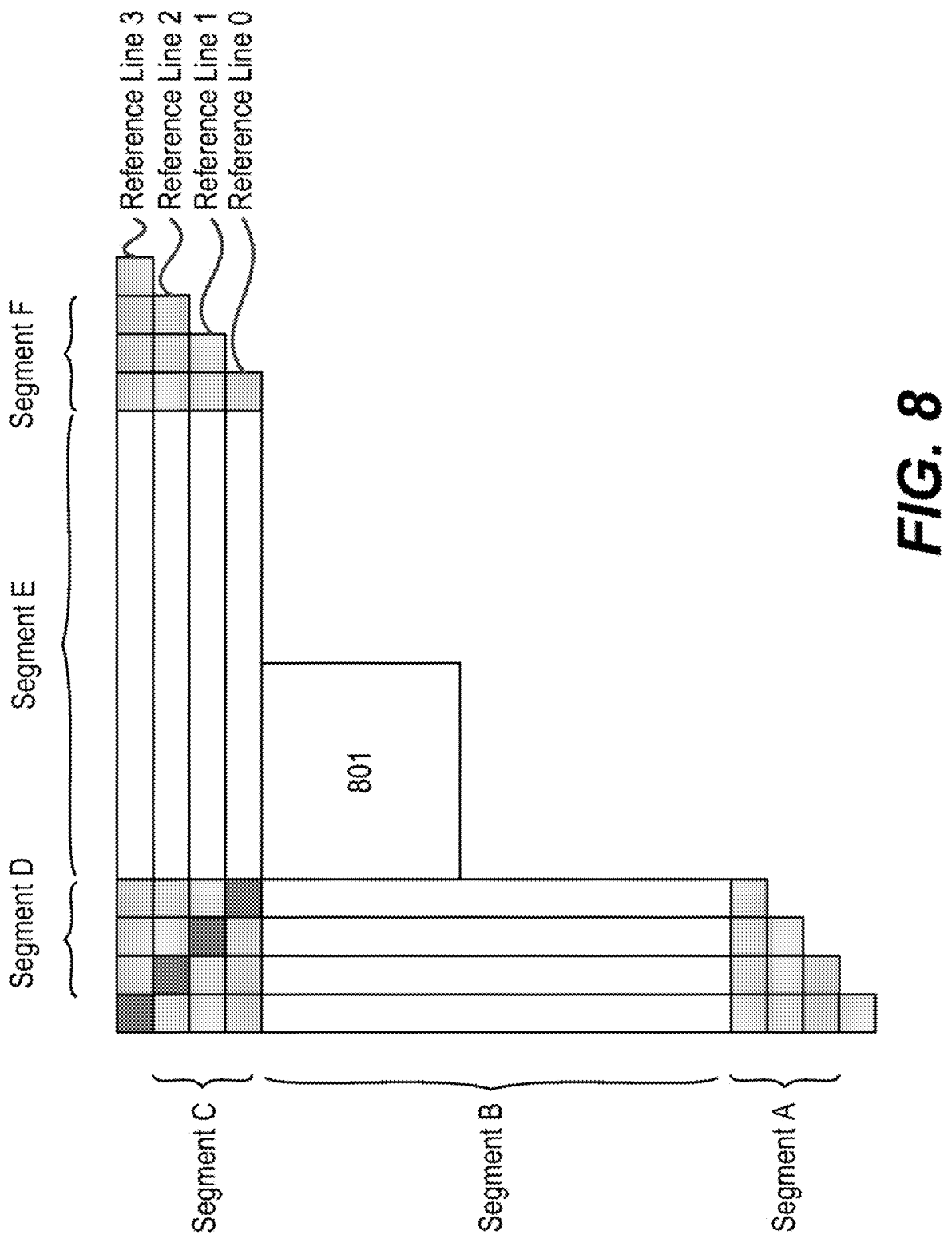
FIG. 8 shows an example of multiple reference line (MRL) prediction according to an aspect of the disclosure.

FIG. 8 shows an example of the MRL prediction (also referred to as the MRL intra prediction) according to an aspect of the disclosure. The MRL intra prediction may use multiple reference lines for intra prediction. Four reference lines 0-3 of a current block (801) are shown in FIG. 8. The reference line i may include reference samples that are i lines away from the current block (801), for example, i lines away from boundaries (e.g., i rows away from a top boundary and/or i columns away from a left boundary) of the current block (801) where i is 0, 1, 2, or 3. For example, the reference line i includes reference samples that are i rows above the top boundary of the current block (801) and/or i columns to the left of the left boundary of the current block (801). In an example, the reference line 0 includes reference samples that are adjacent to the current block (801), such as reconstructed neighboring samples including top neighboring samples that are above the current block (801) and left neighboring samples that are to the left of the block (801). In an example, the reference line 0 may include a top-left reconstructed neighboring sample.

The reference lines 0-3 may include multiple segments, such as segments A-F. In an example, samples of the segments A and F are not fetched from reconstructed neighboring samples. The samples of the segments A and F may be padded (or filled) with the closest samples from the segments B and E, respectively.

In an example, such as in HEVC, the nearest reference line (i.e., reference line 0) is used in intra prediction (or intra-picture prediction). In the MRL intra prediction, multiple reference lines may be used. In an example, two additional lines (e.g., the reference line 1 and the reference line 3) are used.

An index (e.g., a reference line index denoted as mrl_idx) used to select reference line(s) may be signaled and the selected reference line(s) may be used to generate an intra predictor for the current block (801). For the reference line index that is greater than 0, only additional reference line modes may be included in an MPM list and only an MPM index without remaining mode (e.g., the intra prediction modes that are not included in the MPM list) may be signaled. The index may be signaled before intra prediction modes. In an example, certain intra prediction modes (e.g., the planar mode and/or the DC mode) are excluded from intra prediction modes when a nonzero reference line index is signaled.

Figure 9:
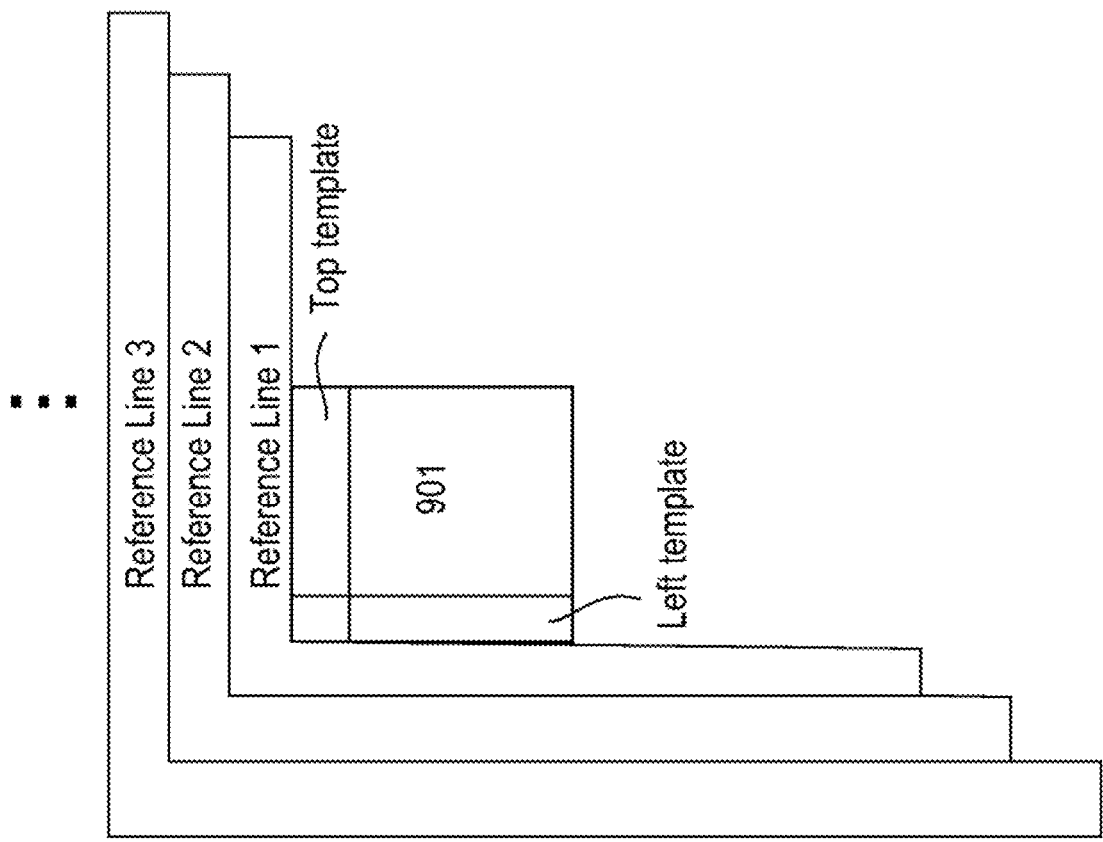
FIG. 9 shows an example of a template-based multiple reference line intra prediction (TMRL) mode according to an aspect of the disclosure.

FIG. 9 shows an example of a template-based multiple reference line intra prediction (TMRL) mode according to an aspect of the disclosure. Referring to FIG. 9, a current block (901) is being coded. A top template is above the current block (901), and a left template is to the left of the current block (901). Reference lines such as reference lines 1-3 are adjacent to the top template and the left template.

The TMRL mode may combine reference line(s) and a prediction mode and may use a template matching method to construct a list of candidate combinations. An index to the candidate combination list may be coded to indicate which reference line and prediction mode is used in coding a current block. In an example, the regular MRL for the non-TIMD part is replaced by the TMRL mode.

The TMRL mode may extend a reference line candidate list and the intra-prediction-mode candidate list. In an example, the extended reference line candidate list is {1, 3, 5, 7, 12}. In an example, the restriction on the top CTU row is unchanged. The size of the intra-prediction-mode candidate list may be 10. In an example, the construction of the intra-prediction-mode candidate list may be similar to MPM except the PLANAR mode is excluded from the intra-prediction-mode candidate list, DC mode is added after 5 neighboring PUs' modes and DIMD modes if it is not included and the angular modes with delta angles from ±1° to ±4° (compared the existing angular modes in the intra-prediction-mode candidate list) are added. The precision of angular prediction may be extended from 65 to 129. In an example, non-adjacent positions are added as candidates in constructing the intra candidate list. In an example, when the neighboring or non-adjacent blocks are coded with a geometric partitioning mode (GPM) or a spatial geometric partitioning mode (SGPM), the intra modes of the blocks are replaced by the partitioning angles.

The TMRL candidate may be constructed as follows. In an example, there are 5×10=50 combinations of the extended reference line and the allowed intra-prediction modes for a block. Since the extended reference line starts from reference line 1, the area covered by reference line 0 may be used for template matching. The SAD costs over the template area such as shown in FIG. 9 may be calculated between the predictions (generated by 50 combinations) and the reconstructions. The 20 combinations with the least SAD cost may be selected in an ascending order to form the TMRL candidate list.

For TMRL signaling, in an example, instead of coding the reference line and the intra mode directly, an index to the TMRL candidate list may be coded to indicate which combination of reference line and prediction mode is used for coding the current block.

Aspects of the disclosure describe template-based prediction methods including improvements to intra mode coding based on a template. A set of methods for video and/or image compression including intra prediction mode coding is described in the disclosure. In an aspect, the intra mode coding includes intra prediction mode coding.

Video coding has been widely used in many applications. Various video coding standards such as H264, H265, H266 (or VVC), AV1, and AVS have been widely adopted. In an aspect, a video codec may include multiple modules, including intra/inter prediction, transform coding, quantization, entropy coding, in loop filtering, and the like. Intra prediction may be one of the main modules, and may include signaling processing methods (e.g., signaling processing methods) and neural network-based methods.

As described above, the method A may include template-based methods such as the TIMD, the DIMD, and the like that can determine an intra prediction mode for the current block. A method B may include intra mode coding methods that use MPMs or an MPM list including MPMs. For example, in the method B, intra prediction modes may include MPMs and non-MPMs which include remaining intra prediction modes that are not MPMs. Examples of intra prediction modes including MPMs used in the method B are shown in FIGS. 4-5.

Figures 10, 11:
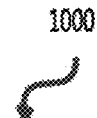
FIG. 10 shows an example of a syntax table including syntax elements of different intra mode coding methods.
FIG. 11 shows an example of a codeword length for most probable modes (MPM) indices according to an aspect of the disclosure.

In the case of the method A, in some examples, only one flag (e.g., a method_A_flag (1001) in FIG. 10) in a bitstream is used to indicate whether the method A is enabled or not. When the method A is enabled, the derived template-based intra mode(s) may be used and the corresponding intra prediction such as the intra prediction based on of the derived template-based intra mode(s) may be performed to generate a prediction signal of the current block. Compared to the intra mode coding used in the method B using MPM(s) and non-MPMs, bit(s) to be signaled in the bitstream may be largely reduced, for example, when the method A is used. For example, more than 1 bit is used to indicate an intra prediction mode in the method B and only 1 bit (e.g., the method_A_flag (1001) in FIG. 10) is used to indicate the intra prediction mode in the method A.

As the method A may use less bits to indicate the used intra prediction mode, syntax-wise the method A may be placed before the method B, as shown in FIG. 10. FIG. 10 shows an example of a syntax table (1000) of the method A and the method B. The syntax table (1000) may be a portion of a syntax structure.

If the method A is chosen, then the method B may not be used, for example, as indicated by a syntax element "return" in FIG. 10. Thus, in the example shown in FIG. 10, only when the method A is not used, then the method B may be used. Syntax elements (1003)-(1005) are associated with the method B. Without loss of generality, the template-derived intra mode in the method A may be combined with other predictors (e.g., other template-derived intra modes with relatively small costs) that may be derived using the method A, and the template-derived intra mode and the other predictors may be referred to as the template-derived intra modes. The descriptor in the syntax table (1000) is shown as an example. The syntax may be coded with context or equal probability, for example.

In an aspect, when the method A is not selected by codec (e.g., for example, an encoder may determine not to use the method A in predicting a current block), the template-based intra mode(s) (e.g., the template-based intra mode(s) derived using the method A such as the TIMD or the DIMD) may be excluded from the method B. In an example, when the method A is not selected by the encoder, the method A may be used to derive the template-based intra mode(s) such as shown with reference to FIGS. 6-7. The template-based intra mode(s) in the method A may use less bits to signal. In an example, that the template-based intra mode(s) have been evaluated and have not been chosen by the encoder may indicate that the prediction signal derived based on the template-based intra mode(s) may not be a good indicator of the current block. Thus, the probability of using the same template-based intra mode(s) in the method B is likely to be relatively low, for example, because the method B may encode more bits than the method A.

According to an aspect of the disclosure, when the method A is determined not to be enabled, the template-based intra mode(s) derived in the method A may be excluded from being used in the method B. In an example, an MPM list including MPMs is constructed in the method B, and the template-based intra mode(s) are excluded from the MPM list. In an example, the template-based intra mode(s) are also excluded from non-MPMs.

In an example, multiple MPM lists such as a primary MPM list and a secondary MPM list may be constructed in the method B, and the template-based intra mode(s) are excluded from each of the multiple MPM lists and from non-MPMs.

In an aspect, the method B is used, for example, by the encoder and the decoder, and the method A is signaled as not enabled (e.g., the method_A_flag (1001) being zero). The method A (e.g., the TIMD or the DIMD) may be performed by the encoder and/or the decoder to derive template-based intra mode(s) (or at least one template-based intra mode).

The template-based intra mode(s) (or the at least one template-based intra mode) may be excluded from the method B.

In an example, at the encoder side, that a first intra mode coding method (e.g., the method A) using one of (i) the TIMD and (ii) the DIMD is not enabled for the current block may be determined. In an example, the first intra mode coding method includes the method A described above. The at least one template-based intra mode or the template-based intra mode(s) may be determined with the first intra mode coding method (e.g., the method A) using the one of (i) the TIMD and the DIMD. When the at least one template-based intra mode is to be excluded from a second intra mode coding method (e.g., the method B) based on the first intra mode coding method not being enabled for the current block, an intra prediction mode of the current block may be determined using the second intra mode coding method that excludes the at least one template-based intra mode. The current block may be encoded, in a bitstream, using the intra prediction mode. A syntax element (e.g., the method_A_flag (1001)) indicating that the first intra mode coding method using the one of the TIMD and the DIMD is not enabled for the current block may be encoded in the bitstream.

In an example, at the decoder side, coded information in a bitstream may be received. The coded information may indicate that the first intra mode coding method (e.g., the method A) using one of (i) the TIMD and (ii) the DIMD is not enabled for a current block. At least one template-based intra mode may be determined with the first intra mode coding method using the one of the TIMD and the DIMD. When the at least one template-based intra mode is to be excluded from the second intra mode coding method (e.g., the method B) based on the first intra mode coding method not being enabled for the current block, the intra prediction mode of the current block may be determined using the second intra mode coding method that excludes the at least one template-based intra mode, and the current block may be reconstructed using the intra prediction mode.

In an aspect, the second intra mode coding method (e.g., the method B) may use an MPM list (e.g., a first MPM list) including MPMs to code (e.g., encode) the intra prediction mode. In an example, the at least one template-based intra mode is to be excluded from the second intra mode coding method (e.g., the method B). The method B may include constructing (or building), from M intra prediction modes, the MPM list (e.g., the first MPM list) including N most probably modes (MPMs) of the current block that excludes the at least one template-based intra mode. In an example, the MPM list (e.g., the first MPM list) of N MPMs is built according to a pre-defined building method out of the M intra prediction modes. In an example, M>N>0. In an example, the number M and the M intra prediction modes may be determined based on a video coding standard. Referring to FIG. 5, the number M is 67 and the 67 intra prediction modes include 65 angular modes, the Planar mode, and the DC mode. In an example, the M intra prediction modes include MPMs and non-MPMs that are remaining intra prediction modes not included in the MPMs. An MPM flag (e.g., the method_B_flag (1003) shown in FIG. 10) may be signaled to indicate whether the intra prediction mode of the current block (or the current coding block) is within the MPM list including the N MPMs or not. If the intra prediction mode of the current block is within the MPM list, a list index may be signaled such as indicated by syntax elements (e.g., method_B_related_syntax) (1004) associated with the method B. Otherwise, the intra prediction mode may be coded, for example, encoded with a truncated binary code using a maximum value of (M–N) and syntax elements (e.g., method_B_related_syntax) (1005) associated with the method B may be used.

In an example, a flag such as the MPM flag (e.g., the method_B_flag (1003) shown in FIG. 10) in the coded information indicating whether the intra prediction mode of the current block is in the first MPM list of the current block. When the flag indicating that the intra prediction mode of the current block is in the first MPM list of the current block, the intra prediction mode of the current block may be determined based on an index (e.g., the list index) indicated by the coded information, such as the syntax elements (e.g., method_B_related_syntax) (1004). When the flag indicating that the intra prediction mode of the current block is not in the first MPM list of the current block, the intra prediction mode of the current block may be determined to be one of remaining intra prediction modes in the M intra prediction modes.

In an aspect, the method B (e.g., the MPMs and non-MPMs based coding method using the MPM list) may be performed as follows. In an example, when the at least one template-based intra mode is included in the MPM list (e.g., an initial first MPM list) according to the pre-defined building method, the MPM list (e.g., the initial first MPM list) may be modified so that the at least one template-based intra mode may be excluded from the MPM list, and thus the MPM list that is modified does not include the at least one template-based intra mode. An MPM list size may be kept unchanged, and the at least one template-based intra mode may be filled (e.g., replaced) by other mode(s) (e.g., other intra prediction mode(s)) that are not the at least one template-based intra mode.

In an example, the initial first MPM list of the current block is constructed (or built) from the M intra prediction modes, and the initial first MPM list includes N intra prediction modes in the M intra prediction modes. For each one of the at least one template-based intra mode, when the respective one of the at least one template-based intra mode is included in the initial first MPM list of the current block, the respective one of the at least one template-based intra mode may be removed from the initial first MPM list of the current block and an intra prediction mode from remaining (M–N) intra prediction modes in the M intra prediction modes may be added to the initial first MPM list to construct the first MPM list of the current block.

In an aspect, the MPM list (e.g., the first MPM list) of the current block may be pruned when the MPM list is being constructed. In an example, the MPM list (e.g., the first MPM list) of the current block may be constructed or built as below. When a candidate intra prediction mode to be added to the first MPM list is one of the at least one template-based intra mode, the candidate intra prediction mode is not added to the MPM list (e.g., the first MPM list) of the current block. When the candidate intra prediction mode to be added to the first MPM list is not one of the at least one template-based intra mode, the candidate intra prediction mode is added to the MPM list (e.g., the first MPM list) of the current block.

In an example, when the at least one template-based intra mode is not within the MPM list according to the pre-defined building method, the at least one template-based intra mode may also be excluded from the non-MPM modes and a maximum value to encode the non-MPM modes may be (M–N–T). A number of the at least one template-based intra mode is T. In an example, T>0. When T is 1, the maximum value to encode the non-MPM modes is (M–N–1).

In an aspect, the method B may be adapted. In addition to the first MPM list (also referred to as a primary MPM list or a PMPM list), a second MPM list (also referred to as a secondary MPM list or an SMPM list) may be introduced with S candidates, such as S intra prediction modes in the M intra prediction modes. In an example, M>S>0. In an example, the PMPM list has 6 entries and the SMPM list includes 16 entries. In an example, a general MPM list with 22 entries is constructed first, and then the first 6 entries in the general MPM list are included into the PMPM list, and the rest of entries form the SMPM list. The signaling of MPM flags (e.g., the MPM flag and a secondary MPM flag) and MPM indices (e.g., the list index and a secondary MPM index) may be similar to that described above. If the MPM flag is false, the secondary MPM flag may be signaled to indicate whether the intra prediction mode is within the second MPM list or not. If the intra prediction mode is within the second MPM list, the secondary MPM index is signaled. Otherwise, if the intra prediction mode is not within the first MPM list and is not within the second MPM list, the intra prediction mode may be coded, for example, encoded with the truncated binary code using a maximum value of (M–N–S).

In an example, a first flag (e.g., the MPM flag such as the method_B_flag (1003) in FIG. 10) in the coded information indicates that the intra prediction mode of the current block is not in the first MPM list (or the primary MPM list) of the current block. When a second flag (e.g., the secondary MPM flag) in the coded information indicates that the intra prediction mode of the current block is in the second MPM list (or the secondary MPM list) of the current block, the intra prediction mode of the current block may be determined based on an index (e.g., the secondary MPM index) indicated by the coded information. When the second flag (e.g., the secondary MPM flag) indicates that the intra prediction mode of the current block is not in the second MPM list of the current block, the intra prediction mode of the current block may be determined to be one of remaining intra prediction modes in the M intra prediction modes.

The method B that is based on MPM lists (e.g., including the PMPM list and the SMPM list) and non-MPMs may be modified as below.

In an example, the pre-defined MPM list construction method is modified so that the at least one template-based intra mode is not added to the primary MPM list (or the first MPM list) and is not added to the secondary MPM list (or the second MPM list). The primary MPM list and the secondary MPM list size may be kept unchanged, and the at least one template-based intra mode may be filled by other mode(s) that are not the at least one template-based intra mode.

In an example, the second intra mode coding method (e.g., the method B) includes constructing, from (M–N) intra prediction modes in the M intra prediction modes that are outside the first MPM list, the second MPM list of the current block that excludes the at least one template-based intra mode. The second MPM list of the current block may include the S intra prediction modes. The first MPM list of the current block may be constructed as below. When a first candidate intra prediction mode to be added to the first MPM list is one of the at least one template-based intra mode, the first candidate intra prediction mode is not added to the first MPM list of the current block. When the first candidate intra prediction mode to be added to the first MPM list is not one of the at least one template-based intra mode, the first candidate intra prediction mode may be added to the first MPM list of the current block. The second MPM list of the current block may be constructed as below. When a second candidate intra prediction mode to be added to the second MPM list is one of the at least one template-based intra mode, the second candidate intra prediction mode is not added to the second MPM list of the current block. When the second candidate intra prediction mode to be added to the second MPM list is not one of the at least one template-based intra mode, the second candidate intra prediction mode may be added to the second MPM list of the current block.

In an example, when the at least one template-based intra mode is not included in the primary MPM list and the secondary MPM list, the at least one template-based intra mode is also excluded from the non-MPM modes and a maximum value to code (e.g., encode) the non-MPM modes may be modified as (M−N−S−T) where T is the number of the at least one template-based intra mode. When T is 1, the maximum value to code (e.g., encode) the non-MPM modes may be modified as (M−N−S−1).

In an example, the at least one template-based intra mode is not in remaining intra prediction modes in the M intra prediction modes that are not included in the first MPM list and the second MPM list. The first MPM list of the current block includes N intra prediction modes in the M intra prediction modes. The number of the at least one template-based intra mode is T. A number of the remaining intra prediction modes is (M−N−S−T). The M intra prediction modes include the N intra prediction modes in the first MPM list, the S intra prediction modes in the second MPM list, the (M−N−S−T) remaining intra prediction modes, and the T at least one template-based intra mode.

In an aspect, the at least one template-based intra mode may be excluded from the second intra mode coding method (e.g., the method B such as an MPM mode coding method) except in some specific positions, such as the first and second entries of an MPM list (e.g., the first MPM list or the PMPM list). If the at least one template-based intra prediction mode is in the first entry and/or in the second entry of the MPM list, the at least one template-based intra prediction mode may be included in the MPM list. As an MPM index or a primary MPM index (e.g., the list index associated with the first MPM list) is coded using a truncated rice code, the first and second entry of the MPM list may have a relatively short code word and due to context coding, the at least one template-based intra prediction mode may be chosen if the at least one template-based intra prediction mode is placed in the first and/or second entry of the MPM list (e.g., the PMPM list). FIG. 11 shows an example of a codeword (e.g., the second column in FIG. 11) for the MPM index from 0 to 5 (e.g., the first column in FIG. 11) according to an aspect of the disclosure. In an example, the 6-MPM list include 6 MPMs indicated by the MPM indices from 0 to 5 may be used in VVC. Codeword lengths associated with the MPM indices 0-5 are 1, 2, 3, 4, 5, and 5, respectively.

In an example, the second intra mode coding method (e.g., the method B) may include constructing, from the M intra prediction modes, the MPM list of the current block by excluding a candidate intra prediction mode from the MPM list when the candidate intra prediction mode is one of the at least one template-based intra mode and the candidate intra prediction mode is to be added to an entry after the first entry and the second entry of the MPM list. Referring to the MPM list indicated in FIG. 11, the MPM list includes the 6 MPMs. If the candidate intra prediction mode is to be placed at the first entry or at the second entry of the MPM list, the candidate intra prediction mode is included in the MPM list. If the candidate intra prediction mode is to be placed at one of the third entry to the sixth entry of the MPM list, the candidate intra prediction mode is excluded in the MPM list.

In an aspect, the at least one template-based intra mode derived in the method A may have more than one mode derived, such as the best mode and the second best mode based on the costs (e.g., the SATD costs), such as described with reference to FIGS. 6-7. The exclusion of the at least one template-based intra mode may be extended for the N-best template-based intra modes determined using the method A as described in the disclosure.

Without loss of generality, the mode exclusion method described above between the template-based method A and the method B (e.g., the MPM and non-MPM intra mode coding method) may be applied between the method A and another intra mode coding method C. In an example, the second intra mode coding method includes the method B, the method C, or the like. In an example, syntax associated with the method C may be put after the syntax associated with the method A. Referring to FIG. 10, the flag (e.g., the method_B_flag) (1003) may be replaced by a flag indicating the method C, and the syntax elements (1004)-(1005) associated with the method B may be replaced by syntax elements associated with the method C. In an example, the at least one template-based intra mode derived in the method A may be excluded from the method C. The at least one template-based intra mode derived in the method A may be used in the method C, for example, when signaling costs are still relatively low. In an example, the method C is the TMRL or a variation of the TMRL.

Without loss of generality, the mode exclusion method described above between the template-based method A and the method B (e.g., the MPM and non-MPM intra mode coding method) may be applied between another template-based method D and the method B. In an example, the template-based mode derivation used in the method D is different from that used in the method A and syntax elements associated with the method D may be put before the syntax elements associated with the method B. Referring to FIG. 10, a syntax element (1002) may be associated with the method D. In an example, the syntax element (1002) indicates whether the method D is enabled for the current block.

FIG. 12 shows a flow chart outlining a process (1200) according to an aspect of the disclosure. The process (1200) may be used in an apparatus, such as a video decoder. In various aspects, the process (1200) is executed by processing circuitry, such as the processing circuitry that performs functions of the video decoder (110), the processing circuitry that performs functions of the video decoder (210), and the like. In some aspects, the process (1200) is implemented in software instructions, thus when the processing circuitry executes the software instructions, the processing circuitry performs the process (1200). The process starts at (S1201) and proceeds to (S1210).

At (S1210), coded information in a bitstream is received. The coded information indicates that a first intra mode coding method (e.g., the method A) using one of (i) the TIMD and (ii) the DIMD is not enabled for a current block.

At (S1220), at least one template-based intra mode may be determined with the first intra mode coding method using the one of the TIMD and the DIMD.

At (S1230), when the at least one template-based intra mode is to be excluded from a second intra mode coding method (e.g., the method B) based on the first intra mode coding method not being enabled for the current block, an intra prediction mode of the current block may be determined using the second intra mode coding method that excludes the at least one template-based intra mode, and the current block may be reconstructed using the intra prediction mode.

In an example, the at least one template-based intra mode is to be excluded from the second intra mode coding method. The second intra mode coding method includes constructing, from M intra prediction modes, a first MPM list of the current block that excludes the at least one template-based intra mode.

In an example, an initial first MPM list of the current block is constructed from the M intra prediction modes. The initial first MPM list includes N intra prediction modes in the M intra prediction modes. For each one of the at least one template-based intra mode, when the respective one of the at least one template-based intra mode is included in the initial first MPM list of the current block, the respective one of the at least one template-based intra mode may be removed from the initial first MPM list of the current block. An intra prediction mode from remaining (M−N) intra prediction modes in the M intra prediction modes may be added to the initial first MPM list to construct the first MPM list of the current block.

In an example, when a candidate intra prediction mode to be added to the first MPM list is one of the at least one template-based intra mode, the candidate intra prediction mode is not added to the first MPM list of the current block. When the candidate intra prediction mode to be added to the first MPM list is not one of the at least one template-based intra mode, the candidate intra prediction mode may be added to the first MPM list of the current block.

In an example, the at least one template-based intra mode is not in remaining intra prediction modes in the M intra prediction modes that are not included in the first MPM list, the first MPM list of the current block includes N intra prediction modes in the M intra prediction modes, a number of the at least one template-based intra mode is T, a number of the remaining intra prediction modes is (M−N−T), and the M intra prediction modes include the N intra prediction mode in the first MPM list, the (M−N−T) remaining intra prediction modes, and the T at least one template-based intra mode.

Then, the process proceeds to (S1299) and terminates.

The process (1200) may be suitably adapted. Step(s) in the process (1200) may be modified and/or omitted. Additional step(s) may be added. Any suitable order of implementation may be used.

In an example, a flag in the coded information indicating whether the intra prediction mode of the current block is in the first MPM list of the current block. When the flag indicating that the intra prediction mode of the current block is in the first MPM list of the current block, the intra prediction mode of the current block may be determined based on an index indicated by the coded information. When the flag indicating that the intra prediction mode of the current block is not in the first MPM list of the current block, the intra prediction mode of the current block may be determined to be one of remaining intra prediction modes in the M intra prediction modes.

In an example, the second intra mode coding method includes constructing, from (M−N) intra prediction modes in the M intra prediction modes that are outside the first MPM list, a second MPM list of the current block that excludes the at least one template-based intra mode. The second MPM list of the current block includes S intra prediction modes. The constructing the first MPM list of the current block includes: when a first candidate intra prediction mode to be added to the first MPM list is one of the at least one template-based intra mode, not adding the first candidate intra prediction mode to the first MPM list of the current block, and when the first candidate intra prediction mode to be added to the first MPM list is not one of the at least one template-based intra mode, adding the first candidate intra prediction mode to the first MPM list of the current block. The constructing the second MPM list of the current block includes: when a second candidate intra prediction mode to be added to the second MPM list is one of the at least one template-based intra mode, not adding the second candidate intra prediction mode to the second MPM list of the current block, and when the second candidate intra prediction mode to be added to the second MPM list is not one of the at least one template-based intra mode, adding the second candidate intra prediction mode to the second MPM list of the current block.

In an example, the at least one template-based intra mode is not in remaining intra prediction modes in the M intra prediction modes that are not included in the first MPM list and the second MPM list, the first MPM list of the current block includes N intra prediction modes in the M intra prediction modes, a number of the at least one template-based intra mode is T, a number of the remaining intra prediction modes is (M−N−S−T), and the M intra prediction modes include the N intra prediction modes in the first MPM list, the S intra prediction modes in the second MPM list, the (M−N−S−T) remaining intra prediction modes, and the T at least one template-based intra mode.

In an example, a first flag in the coded information indicates that the intra prediction mode of the current block is not in the first MPM list of the current block. When a second flag in the coded information indicates that the intra prediction mode of the current block is in the second MPM list of the current block, the intra prediction mode of the current block may be determined based on an index indicated by the coded information. When the second flag indicates that the intra prediction mode of the current block is not in the second MPM list of the current block, the intra prediction mode of the current block may be determined to be one of remaining intra prediction modes in the M intra prediction modes.

In an example, the second intra mode coding method includes constructing, from M intra prediction modes, a most probable mode (MPM) list of the current block by excluding a candidate intra prediction mode from the MPM list when the candidate intra prediction mode is one of the at least one template-based intra mode and the candidate intra prediction mode is to be added to an entry after a first entry and a second entry of the MPM list.

In an example, the second intra mode coding method includes the method B.

In an example, the second intra mode coding method includes the TMRL mode.

In an example, the method further comprises determining whether to include the at least one template-based intra mode in the second intra mode coding method.

FIG. 13 shows a flow chart outlining a process (1300) according to an aspect of the disclosure. The process (1300) may be used in a video encoder. In various aspects, the process (1300) is executed by processing circuitry, such as the processing circuitry that performs functions of the video encoder (103), the processing circuitry that performs functions of the video encoder (303), and the like. In some aspects, the process (1300) is implemented in software instructions, thus when the processing circuitry executes the software instructions, the processing circuitry performs the process (1300). The process starts at (S1301) and proceeds to (S1310).

At (S1310), that a first intra mode coding method using one of (i) the TIMD and (ii) the DIMD is not enabled for a current block may be determined.

At (S1320), at least one template-based intra mode may be determined with the first intra mode coding method using the one of (i) the TIMD and (ii) the DIMD.

At (S1330), when the at least one template-based intra mode is to be excluded from a second intra mode coding method based on the first intra mode coding method not being enabled for the current block, an intra prediction mode of the current block may be determined using the second intra mode coding method that excludes the at least one template-based intra mode, and the current block may be encoded, in a bitstream, using the intra prediction mode.

At (S1340), a syntax element indicating that the first intra mode coding method using the one of the TIMD and the DIMD is not enabled for the current block may be encoded, in the bitstream.

Then, the process proceeds to (S1399) and terminates.

The process (1300) may be suitably adapted. Step(s) in the process (1300) may be modified and/or omitted. Additional step(s) may be added. Any suitable order of implementation may be used.

In an example, the at least one template-based intra mode is to be excluded from the second intra mode coding method. The second intra mode coding method includes constructing, from M intra prediction modes, a first most probable mode (MPM) list of the current block that excludes the at least one template-based intra mode.

In an example, the constructing the first MPM list of the current block includes: constructing an initial first MPM list of the current block from the M intra prediction modes. The initial first MPM list includes N intra prediction modes in the M intra prediction modes. For each one of the at least one template-based intra mode, when the respective one of the at least one template-based intra mode is included in the initial first MPM list of the current block, the respective one of the at least one template-based intra mode may be removed from the initial first MPM list of the current block. An intra prediction mode from remaining (M–N) intra prediction modes in the M intra prediction modes may be added to the initial first MPM list to construct the first MPM list of the current block.

In an example, the constructing the first MPM list of the current block includes: when a candidate intra prediction mode to be added to the first MPM list is one of the at least one template-based intra mode, not adding the candidate intra prediction mode to the first MPM list of the current block, and when the candidate intra prediction mode to be added to the first MPM list is not one of the at least one template-based intra mode, adding the candidate intra prediction mode to the first MPM list of the current block.

In an example, the at least one template-based intra mode is not in remaining intra prediction modes in the M intra prediction modes that are not included in the first MPM list, the first MPM list of the current block includes N intra prediction modes in the M intra prediction modes, a number of the at least one template-based intra mode is T, a number of the remaining intra prediction modes is (M–N–T), and the M intra prediction modes include the N intra prediction modes in the first MPM list, the (M–N–T) remaining intra prediction modes, and the T at least one template-based intra mode.

In an example, the second intra mode coding method includes constructing, from (M–N) intra prediction modes in the M intra prediction modes that are outside the first MPM list, a second MPM list of the current block that excludes the at least one template-based intra mode. The second MPM list of the current block includes S intra prediction modes. The constructing the first MPM list of the current block includes: when a first candidate intra prediction mode to be added to the first MPM list is one of the at least one template-based intra mode, not adding the first candidate intra prediction mode to the first MPM list of the current block; and when the first candidate intra prediction mode to be added to the first MPM list is not one of the at least one template-based intra mode, adding the first candidate intra prediction mode to the first MPM list of the current block. The constructing the second MPM list of the current block includes: when a second candidate intra prediction mode to be added to the second MPM list is one of the at least one template-based intra mode, not adding the second candidate intra prediction mode to the second MPM list of the current block; and when the second candidate intra prediction mode to be added to the second MPM list is not one of the at least one template-based intra mode, adding the second candidate intra prediction mode to the second MPM list of the current block.

In an example, the second intra mode coding method includes constructing, from M intra prediction modes, a most probable mode (MPM) list of the current block by excluding a candidate intra prediction mode from the MPM list when the candidate intra prediction mode is one of the at least one template-based intra mode and the candidate intra prediction mode is to be added to an entry after a first entry and a second entry of the MPM list.

Although the decoding and encoding processes are provided in separate flow charts for the purpose of description, it is noted that aspects of the decoding and encoding processes may be used in combination. For example, a decoding process such as described in the process (1200) may incorporate all or a portion of the process (1300). In another example, an encoding process such as described in the process (1300) may be combined with the process (1200).

In an aspect, a method of processing visual media data is disclosed. The method includes processing a bitstream of the visual media data according to a format rule. The bitstream includes a syntax element indicating that a first intra mode coding method using one of (i) a template-based intra prediction mode derivation (TIMD) and (ii) a decoder-side intra mode derivation (DIMD) is not enabled for a current block. The format rule specifies that: at least one template-based intra mode is determined with the first intra mode coding method using the one of the TIMD and the DIMD; and when the at least one template-based intra mode is to be excluded from a second intra mode coding method based on the first intra mode coding method not being enabled for the current block, an intra prediction mode of the current block is determined using the second intra mode coding method that excludes the at least one template-based intra mode and the current block is processed using the intra prediction mode.

Aspects and/or examples in the disclosure may be used separately or combined in any order. For example, some aspects and/or examples performed by the decoder may be performed by the encoder and vice versa. Each of the methods, aspects, examples, an encoder, and a decoder may be implemented by processing circuitry (e.g., one or more processors or one or more integrated circuits). In one example, the one or more processors execute a program that is stored in a non-transitory computer-readable medium.

The techniques described above, may be implemented as computer software using computer-readable instructions and physically stored in one or more computer-readable media. For example, FIG. 14 shows a computer system (1400) suitable for implementing certain aspects of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by one or more computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 14:
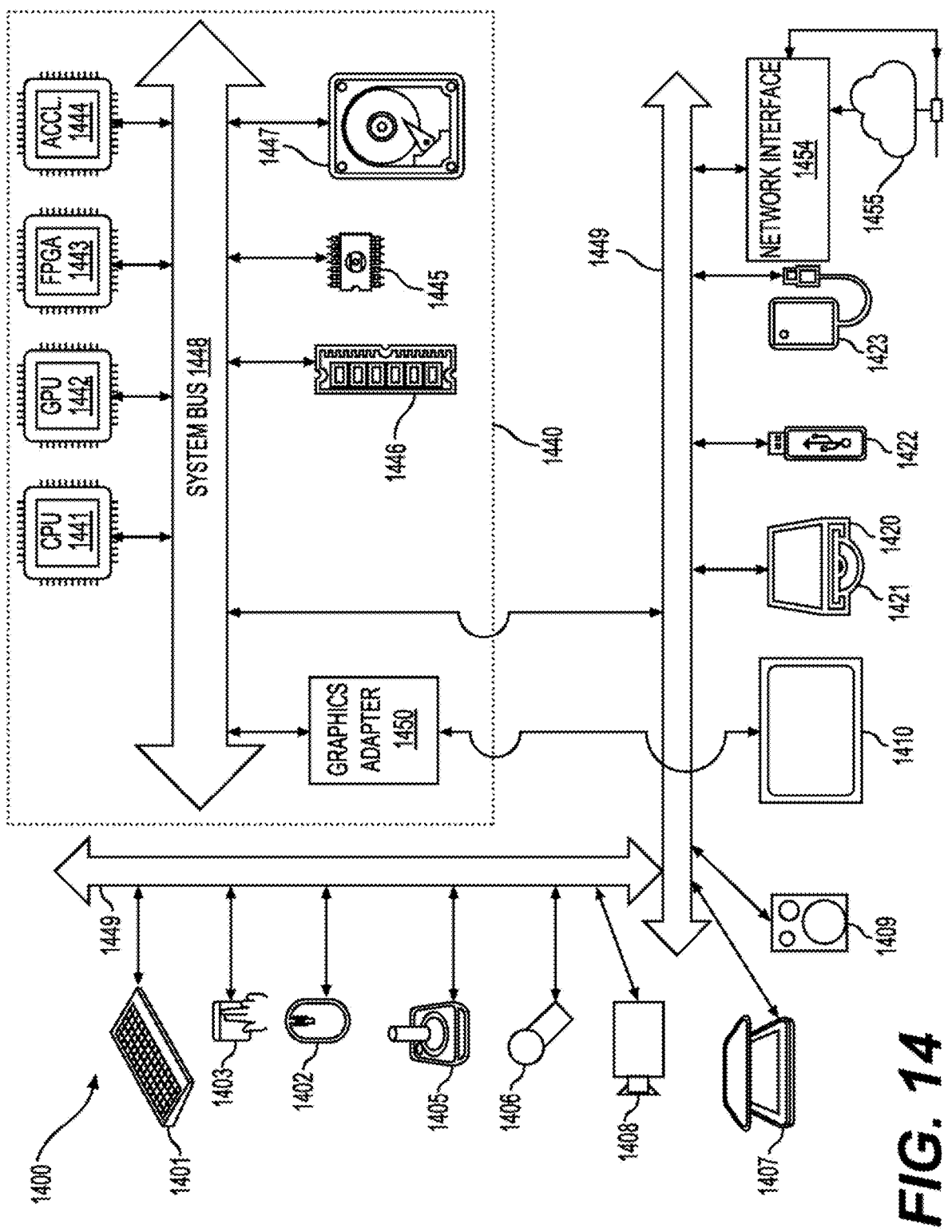
FIG. 14 is a schematic illustration of a computer system in accordance with an aspect.

The components shown in FIG. 14 for computer system (1400) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various aspects of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hard-wired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method for video decoding, the method including: receiving coded information in a bitstream, the coded information indicating that a first intra mode coding method using one of (i) a template-based intra prediction mode derivation (TIMD) and (ii) a decoder-side intra mode derivation (DIMD) is not enabled for a current block; determining at least one template-based intra mode with the first intra mode coding method using the one of the TIMD and the DIMD; and when the at least one template-based intra mode is to be excluded from a second intra mode coding method based on the first intra mode coding method not being enabled for the current block, determining an intra prediction mode of the current block using the second intra mode coding method that excludes the at least one template-based intra mode, and reconstructing the current block using the intra prediction mode.

(2) The method of feature (1), in which the at least one template-based intra mode is to be excluded from the second intra mode coding method; and the second intra mode coding method includes constructing, from M intra prediction modes, a first most probable mode (MPM) list of the current block that excludes the at least one template-based intra mode.

(3) The method of feature (2), in which the constructing the first MPM list of the current block includes: constructing an initial first MPM list of the current block from the M intra prediction modes, the initial first MPM list including N intra prediction modes in the M intra prediction modes; for each one of the at least one template-based intra mode, when the respective one of the at least one template-based intra mode is included in the initial first MPM list of the current block, removing the respective one of the at least one template-based intra mode from the initial first MPM list of the current block; and adding an intra prediction mode from remaining (M–N) intra prediction modes in the M intra prediction modes to the initial first MPM list to construct the first MPM list of the current block.

(4) The method of feature (2), in which the constructing the first MPM list of the current block includes: when a candidate intra prediction mode to be added to the first MPM list is one of the at least one template-based intra mode, not adding the candidate intra prediction mode to the first MPM list of the current block; and when the candidate intra prediction mode to be added to the first MPM list is not one of the at least one template-based intra mode, adding the candidate intra prediction mode to the first MPM list of the current block.

(5) The method of feature (2), in which the at least one template-based intra mode is not in remaining intra prediction modes in the M intra prediction modes that are not included in the first MPM list, the first MPM list of the current block includes N intra prediction modes in the M intra prediction modes, a number of the at least one template-based intra mode is T, a number of the remaining intra prediction modes is (M–N–T), and the M intra prediction modes include the N intra prediction modes in the first MPM list, the (M–N–T) remaining intra prediction modes, and the T at least one template-based intra mode.

(6) The method of any of features (1) to (5), in which a flag in the coded information indicating whether the intra prediction mode of the current block is in the first MPM list of the current block; when the flag indicating that the intra prediction mode of the current block is in the first MPM list of the current block, determining the intra prediction mode of the current block based on an index indicated by the coded information; and when the flag indicating that the intra prediction mode of the current block is not in the first MPM list of the current block, determining the intra prediction mode of the current block to be one of remaining intra prediction modes in the M intra prediction modes.

(7) The method of any features (2) and (4)-(6), in which the second intra mode coding method includes constructing, from (M–N) intra prediction modes in the M intra prediction modes that are outside the first MPM list, a second MPM list of the current block that excludes the at least one template-based intra mode, the second MPM list of the current block including S intra prediction modes; the constructing the first MPM list of the current block includes: when a first candidate intra prediction mode to be added to the first MPM list is one of the at least one template-based intra mode, not adding the first candidate intra prediction mode to the first MPM list of the current block; and when the first candidate intra prediction mode to be added to the first MPM list is not one of the at least one template-based intra mode, adding the first candidate intra prediction mode to the first MPM list of the current block; and the constructing the second MPM list of the current block includes: when a second candidate intra prediction mode to be added to the second MPM list is one of the at least one template-based intra mode, not adding the second candidate intra prediction mode to the second MPM list of the current block; and when the second candidate intra prediction mode to be added to the second MPM list is not one of the at least one template-based intra mode, adding the second candidate intra prediction mode to the second MPM list of the current block.

(8) The method of feature (7), in which the at least one template-based intra mode is not in remaining intra prediction modes in the M intra prediction modes that are not included in the first MPM list and the second MPM list, the first MPM list of the current block includes N intra prediction modes in the M intra prediction modes, a number of the at least one template-based intra mode is T, a number of the remaining intra prediction modes is (M–N–S–T), and the M intra prediction modes include the N intra prediction modes in the first MPM list, the S intra prediction modes in the second MPM list, the (M–N–S–T) remaining intra prediction modes, and the T at least one template-based intra mode.

(9) The method of feature (7), in which a first flag in the coded information indicates that the intra prediction mode of the current block is not in the first MPM list of the current block, when a second flag in the coded information indicates that the intra prediction mode of the current block is in the second MPM list of the current block, determining the intra prediction mode of the current block based on an index indicated by the coded information; and when the second flag indicates that the intra prediction mode of the current block is not in the second MPM list of the current block, determining the intra prediction mode of the current block to be one of remaining intra prediction modes in the M intra prediction modes.

(10) The method of feature (1), in which the second intra mode coding method comprises constructing, from M intra prediction modes, a most probable mode (MPM) list of the current block by excluding a candidate intra prediction mode from the MPM list when the candidate intra prediction mode is one of the at least one template-based intra mode and the candidate intra prediction mode is to be added to an entry after a first entry and a second entry of the MPM list.

(11) The method of feature (1), in which the second intra mode coding method comprises a template-based multiple reference line intra prediction (TMRL) mode.

(12) The method of any of features (1) to (11), in which the method further comprises determining whether to include the at least one template-based intra mode in the second intra mode coding method.

(13) A method for video encoding, the method including: determining that a first intra mode coding method using one of (i) a template-based intra prediction mode derivation (TIMD) and (ii) a decoder-side intra mode derivation (DIMD) is not enabled for a current block; determining at least one template-based intra mode with the first intra mode coding method using the one of (i) the TIMD and (ii) the DIMD; when the at least one template-based intra mode is to be excluded from a second intra mode coding method based on the first intra mode coding method not being enabled for the current block, determining an intra prediction mode of the current block using the second intra mode coding method that excludes the at least one template-based intra mode, and encoding, in a bitstream, the current block using the intra prediction mode; and encoding, in the bitstream, a syntax element indicating that the first intra mode coding method using the one of the TIMD and the DIMD is not enabled for the current block.

(14) The method of feature (13), in which the at least one template-based intra mode is to be excluded from the second intra mode coding method; and the second intra mode coding method comprises constructing, from M intra prediction modes, a first most probable mode (MPM) list of the current block that excludes the at least one template-based intra mode.

(15) The method of feature (14), in which the constructing the first MPM list of the current block includes: constructing an initial first MPM list of the current block from the M intra prediction modes, the initial first MPM list including N intra prediction modes in the M intra prediction modes; for each one of the at least one template-based intra mode, when the respective one of the at least one template-based intra mode is included in the initial first MPM list of the current block, removing the respective one of the at least one template-based intra mode from the initial first MPM list of the current block; and adding an intra prediction mode from remaining (M–N) intra prediction modes in the M intra prediction modes to the initial first MPM list to construct the first MPM list of the current block.

(16) The method of feature (14), in which the constructing the first MPM list of the current block includes: when a candidate intra prediction mode to be added to the first MPM list is one of the at least one template-based intra mode, not adding the candidate intra prediction mode to the first MPM list of the current block; and when the candidate intra prediction mode to be added to the first MPM list is not one of the at least one template-based intra mode, adding the candidate intra prediction mode to the first MPM list of the current block.

(17) The method of feature (14), in which the at least one template-based intra mode is not in remaining intra prediction modes in the M intra prediction modes that are not included in the first MPM list, the first MPM list of the current block includes N intra prediction modes in the M intra prediction modes, a number of the at least one template-based intra mode is T, a number of the remaining intra prediction modes is (M–N–T), and the M intra prediction modes include the N intra prediction modes in the first MPM list, the (M–N–T) remaining intra prediction modes, and the T at least one template-based intra mode.

(18) The method of feature (14), in which the second intra mode coding method includes constructing, from (M–N) intra prediction modes in the M intra prediction modes that are outside the first MPM list, a second MPM list of the current block that excludes the at least one template-based intra mode, the second MPM list of the current block including S intra prediction modes; the constructing the first MPM list of the current block includes: when a first candidate intra prediction mode to be added to the first MPM list is one of the at least one template-based intra mode, not adding the first candidate intra prediction mode to the first MPM list of the current block; and when the first candidate intra prediction mode to be added to the first MPM list is not one of the at least one template-based intra mode, adding the first candidate intra prediction mode to the first MPM list of the current block; and the constructing the second MPM list of the current block includes: when a second candidate intra prediction mode to be added to the second MPM list is one of the at least one template-based intra mode, not adding the second candidate intra prediction mode to the second MPM list of the current block; and when the second candidate intra prediction mode to be added to the second MPM list is not one of the at least one template-based intra mode, adding the second candidate intra prediction mode to the second MPM list of the current block.

(19) The method of feature (13), in which the second intra mode coding method comprises constructing, from M intra prediction modes, a most probable mode (MPM) list of the current block by excluding a candidate intra prediction mode from the MPM list when the candidate intra prediction mode is one of the at least one template-based intra mode and the candidate intra prediction mode is to be added to an entry after a first entry and a second entry of the MPM list.

(20) A method of processing visual media data, the method including: processing a bitstream of the visual media data according to a format rule. The bitstream includes a syntax element indicating that a first intra mode coding method using one of (i) a template-based intra prediction mode derivation (TIMD) and (ii) a decoder-side intra mode derivation (DIMD) is not enabled for a current block. The format rule specifies that: at least one template-based intra mode is determined with the first intra mode coding method using the one of the TIMD and the DIMD; and when the at least one template-based intra mode is to be excluded from a second intra mode coding method based on the first intra mode coding method not being enabled for the current block, an intra prediction mode of the current block is determined using the second intra mode coding method that excludes the at least one template-based intra mode and the current block is processed using the intra prediction mode.

(21) An apparatus for video decoding, including processing circuitry that is configured to perform the method of any of features (1) to (12).

(22) An apparatus for video encoding, including processing circuitry that is configured to perform the method of any of features (13) to (19).

(23) A non-transitory computer-readable storage medium storing instructions which when executed by at least one processor cause the at least one processor to perform the method of any of features (1) to (19).

What is claimed is:

1. A method for video decoding, the method comprising:
receiving coded information in a bitstream, the coded information indicating that a first intra mode coding method using one of (i) a template-based intra prediction mode derivation (TIMD) and (ii) a decoder-side intra mode derivation (DIMD) is not enabled for a current block;
determining at least one template-based intra mode with the first intra mode coding method using the one of the TIMD and the DIMD; and
when the at least one template-based intra mode is to be excluded from a second intra mode coding method based on the first intra mode coding method not being enabled for the current block,
determining an intra prediction mode of the current block using the second intra mode coding method that excludes the at least one template-based intra mode, the second intra mode coding method being different from the TIMD and the DIMD, and
reconstructing the current block using the intra prediction mode.

2. The method of claim 1, wherein
the at least one template-based intra mode is to be excluded from the second intra mode coding method; and
the second intra mode coding method comprises constructing, from M intra prediction modes, a first most probable mode (MPM) list of the current block that excludes the at least one template-based intra mode.

3. The method of claim 2, wherein the constructing the first MPM list of the current block comprises:
constructing an initial first MPM list of the current block from the M intra prediction modes, the initial first MPM list including N intra prediction modes in the M intra prediction modes; and
for each one of the at least one template-based intra mode, when the respective one of the at least one template-based intra mode is included in the initial first MPM list of the current block, removing the respective one of the at least one template-based intra mode from the initial first MPM list of the current block; and
adding an intra prediction mode from remaining (M−N) intra prediction modes in the M intra prediction modes to the initial first MPM list to construct the first MPM list of the current block.

4. The method of claim 2, wherein the constructing the first MPM list of the current block comprises:
when a candidate intra prediction mode to be added to the first MPM list is one of the at least one template-based intra mode, not adding the candidate intra prediction mode to the first MPM list of the current block; and
when the candidate intra prediction mode to be added to the first MPM list is not one of the at least one template-based intra mode, adding the candidate intra prediction mode to the first MPM list of the current block.

5. The method of claim 2, wherein the at least one template-based intra mode is not in remaining intra prediction modes in the M intra prediction modes that are not included in the first MPM list, the first MPM list of the current block includes N intra prediction modes in the M intra prediction modes, a number of the at least one template-based intra mode is T, a number of the remaining intra prediction modes in the M intra prediction modes that are not included in the first MPM list is (M−N−T), and the M intra prediction modes include the N intra prediction modes in the first MPM list, the (M−N−T) remaining intra prediction modes, and the T at least one template-based intra mode, each of the (M−N−T) remaining intra prediction modes being excluded from the first MPM list and being excluded from the at least one template-based intra mode.

6. The method of claim 2, wherein
a flag in the coded information indicating whether the intra prediction mode of the current block is in the first MPM list of the current block;
when the flag indicating that the intra prediction mode of the current block is in the first MPM list of the current block, determining the intra prediction mode of the current block based on an index indicated by the coded information; and
when the flag indicating that the intra prediction mode of the current block is not in the first MPM list of the current block, determining the intra prediction mode of the current block to be one of remaining intra predic-
tion modes in the M intra prediction modes, each of the
remaining intra prediction modes being excluded from
the first MPM list and being excluded from the at least
one template-based intra mode.

7. The method of claim 2, wherein
the second intra mode coding method includes construct-
ing, from (M-N) intra prediction modes in the M intra
prediction modes that are outside the first MPM list, a
second MPM list of the current block that excludes the
at least one template-based intra mode, the second
MPM list of the current block including S intra pre-
diction modes, the first MPM list of the current block
including N intra prediction modes in the M intra
prediction modes;
the constructing the first MPM list of the current block
includes:
    when a first candidate intra prediction mode to be
    added to the first MPM list is one of the at least one
    template-based intra mode, not adding the first can-
    didate intra prediction mode to the first MPM list of
    the current block; and
    when the first candidate intra prediction mode to be
    added to the first MPM list is not one of the at least
    one template-based intra mode, adding the first can-
    didate intra prediction mode to the first MPM list of
    the current block; and
the constructing the second MPM list of the current block
includes:
    when a second candidate intra prediction mode to be
    added to the second MPM list is one of the at least
    one template-based intra mode, not adding the sec-
    ond candidate intra prediction mode to the second
    MPM list of the current block; and
    when the second candidate intra prediction mode to be
    added to the second MPM list is not one of the at
    least one template-based intra mode, adding the
    second candidate intra prediction mode to the second
    MPM list of the current block.

8. The method of claim 7, wherein the at least one
template-based intra mode is not in remaining intra predic-
tion modes in the M intra prediction modes that are not
included in the first MPM list and the second MPM list, a
number of the at least one template-based intra mode is T, a
number of the remaining intra prediction modes is (M−N−
S−T), and the M intra prediction modes include the N intra
prediction modes in the first MPM list, the S intra prediction
modes in the second MPM list, the (M−N−S−T) remaining
intra prediction modes, and the T at least one template-based
intra mode, each of the (M−N−S−T) remaining intra pre-
diction modes being excluded from the first MPM list, being
excluded from the second MPM list, and being excluded
from the at least one template-based intra mode.

9. The method of claim 7, wherein
a first flag in the coded information indicates that the intra
prediction mode of the current block is not in the first
MPM list of the current block,
when a second flag in the coded information indicates that
the intra prediction mode of the current block is in the
second MPM list of the current block, determining the
intra prediction mode of the current block based on an
index indicated by the coded information; and
when the second flag indicates that the intra prediction
mode of the current block is not in the second MPM list
of the current block, determining the intra prediction
mode of the current block to be one of remaining intra
prediction modes in the M intra prediction modes, each of the remaining intra prediction modes being excluded
from the first MPM list, being excluded from the
second MPM list, and being excluded from the at least
one template-based intra mode.

10. The method of claim 1, wherein
the second intra mode coding method comprises con-
structing, from M intra prediction modes, a most prob-
able mode (MPM) list of the current block by
excluding a candidate intra prediction mode from the
MPM list when the candidate intra prediction mode is
one of the at least one template-based intra mode and
the candidate intra prediction mode is to be added to an
entry after a first entry and a second entry of the MPM
list.

11. The method of claim 1, wherein the second intra mode
coding method comprises a template-based multiple refer-
ence line intra prediction (TMRL) mode.

12. The method of claim 1, wherein the method further
comprises determining whether to include the at least one
template-based intra mode in the second intra mode coding
method.

13. A method for video encoding, the method comprising:
determining that a first intra mode coding method using
    one of (i) a template-based intra prediction mode
    derivation (TIMD) and (ii) a decoder-side intra mode
    derivation (DIMD) is not enabled for a current block;
determining at least one template-based intra mode with
    the first intra mode coding method using the one of (i)
    the TIMD and (ii) the DIMD;
when the at least one template-based intra mode is to be
    excluded from a second intra mode coding method
    based on the first intra mode coding method not being
    enabled for the current block,
    determining an intra prediction mode of the current
        block using the second intra mode coding method
        that excludes the at least one template-based intra
        mode, the second intra mode coding method being
        different from the TIMD and the DIMD, and
    encoding, in a bitstream, the current block using the
        intra prediction mode; and
encoding, in the bitstream, a syntax element indicating
    that the first intra mode coding method using the one of
    the TIMD and the DIMD is not enabled for the current
    block.

14. The method of claim 13, wherein
the at least one template-based intra mode is to be
    excluded from the second intra mode coding method;
    and
the second intra mode coding method comprises con-
    structing, from M intra prediction modes, a first most
    probable mode (MPM) list of the current block that
    excludes the at least one template-based intra mode.

15. The method of claim 14, wherein the constructing the
first MPM list of the current block comprises:
constructing an initial first MPM list of the current block
    from the M intra prediction modes, the initial first
    MPM list including N intra prediction modes in the M
    intra prediction modes; and
for each one of the at least one template-based intra mode,
    when the respective one of the at least one template-
        based intra mode is included in the initial first MPM
        list of the current block, removing the respective one
        of the at least one template-based intra mode from
        the initial first MPM list of the current block; and
    adding an intra prediction mode from remaining (M−N)
        intra prediction modes in the M intra prediction modes to the initial first MPM list to construct the first MPM list of the current block.

16. The method of claim 14, wherein the constructing the first MPM list of the current block comprises:

when a candidate intra prediction mode to be added to the first MPM list is one of the at least one template-based intra mode, not adding the candidate intra prediction mode to the first MPM list of the current block; and when the candidate intra prediction mode to be added to the first MPM list is not one of the at least one template-based intra mode, adding the candidate intra prediction mode to the first MPM list of the current block.

17. The method of claim 14, wherein the at least one template-based intra mode is not in remaining intra prediction modes in the M intra prediction modes that are not included in the first MPM list, the first MPM list of the current block includes N intra prediction modes in the M intra prediction modes, a number of the at least one template-based intra mode is T, a number of the remaining intra prediction modes in the M intra prediction modes that are not included in the first MPM list is (M–N–T), and the M intra prediction modes include the N intra prediction modes in the first MPM list, the (M–N–T) remaining intra prediction modes, and the T at least one template-based intra mode, each of the (M–N–T) remaining intra prediction modes being excluded from the first MPM list and being excluded from the at least one template-based intra mode.

18. The method of claim 14, wherein the second intra mode coding method includes constructing, from (M–N) intra prediction modes in the M intra prediction modes that are outside the first MPM list, a second MPM list of the current block that excludes the at least one template-based intra mode, the second MPM list of the current block including S intra prediction modes, the first MPM list of the current block including N intra prediction modes in the M intra prediction modes;

the constructing the first MPM list of the current block includes:

when a first candidate intra prediction mode to be added to the first MPM list is one of the at least one template-based intra mode, not adding the first candidate intra prediction mode to the first MPM list of the current block; and when the first candidate intra prediction mode to be added to the first MPM list is not one of the at least one template-based intra mode, adding the first candidate intra prediction mode to the first MPM list of the current block; and the constructing the second MPM list of the current block includes:

when a second candidate intra prediction mode to be added to the second MPM list is one of the at least one template-based intra mode, not adding the second candidate intra prediction mode to the second MPM list of the current block; and when the second candidate intra prediction mode to be added to the second MPM list is not one of the at least one template-based intra mode, adding the second candidate intra prediction mode to the second MPM list of the current block.

19. The method of claim 13, wherein the second intra mode coding method comprises constructing, from M intra prediction modes, a most probable mode (MPM) list of the current block by excluding a candidate intra prediction mode from the MPM list when the candidate intra prediction mode is one of the at least one template-based intra mode and the candidate intra prediction mode is to be added to an entry after a first entry and a second entry of the MPM list.

20. A non-transitory computer-readable storage medium storing instructions which when executed by a processor cause the processor to perform a method of encoding a bitstream comprising:

determining that a first intra mode coding method using one of (i) a template-based intra prediction mode derivation (TIMD) and (ii) a decoder-side intra mode derivation (DIMD) is not enabled for a current block;

determining at least one template-based intra mode with the first intra mode coding method using the one of (i) the TIMD and (ii) the DIMD;

when the at least one template-based intra mode is to be excluded from a second intra mode coding method based on the first intra mode coding method not being enabled for the current block, determining an intra prediction mode of the current block using the second intra mode coding method that excludes the at least one template-based intra mode, the second intra mode coding method being different from the TIMD and the DIMD, and encoding, in the bitstream, the current block using the intra prediction mode;

encoding, in the bitstream, a syntax element indicating that the first intra mode coding method using the one of the TIMD and the DIMD is not enabled for the current block; and transmitting the bitstream.

* * * * *